(12) United States Patent
Kasahara et al.

(10) Patent No.: US 11,506,910 B2
(45) Date of Patent: Nov. 22, 2022

(54) OPTICAL UNIT WITH SHAKE CORRECTION FUNCTION

(71) Applicant: NIDEC SANKYO CORPORATION, Nagano (JP)

(72) Inventors: Shogo Kasahara, Nagano (JP); Shinji Hatano, Nagano (JP); Tsutomu Arai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 168 days.

(21) Appl. No.: 17/155,106

(22) Filed: Jan. 22, 2021

(65) Prior Publication Data
US 2021/0240000 A1 Aug. 5, 2021

(30) Foreign Application Priority Data
Jan. 30, 2020 (JP) .............................. JP2020-013333

(51) Int. Cl.
*G02B 27/64* (2006.01)
*G02B 7/02* (2021.01)

(52) U.S. Cl.
CPC ............. *G02B 27/646* (2013.01); *G02B 7/02* (2013.01)

(58) Field of Classification Search
CPC ................... G02B 27/646; G02B 7/02; G03B 2205/0007; G03B 2205/0023; G03B 2205/0069; G03B 5/00; H04N 5/2254; H04N 5/2257; H04N 5/23261; H04N 5/23287
See application file for complete search history.

(56) References Cited

U.S. PATENT DOCUMENTS

| 9,933,629 B2 | 4/2018 | Minamisawa |
| 10,048,508 B2 | 8/2018 | Sue et al. |

(Continued)

FOREIGN PATENT DOCUMENTS

| CN | 101126832 | 2/2008 |
| CN | 101685235 | 3/2010 |

(Continued)

OTHER PUBLICATIONS

Office Action of China Counterpart Application, with English translation thereof, dated Feb. 11, 2022, pp. 1-18.

*Primary Examiner* — Darryl J Collins
*Assistant Examiner* — Matthew Y Lee
(74) *Attorney, Agent, or Firm* — JCIPRNET

(57) ABSTRACT

An optical unit may include a movable body, a turning support mechanism turnably supporting the movable body around an optical axis, a gimbal mechanism turnably supporting the turning support mechanism, and a fixed body. The turning support mechanism includes a plate roll fixed to the movable body, a plate holder having a facing part facing the plate roll in the optical axis direction and is turnably supported by the gimbal mechanism, spherical bodies disposed between the plate roll and the facing part, and a magnetic attraction mechanism for generating an attraction force so that the plate roll and the facing part approach each other in the optical axis direction. The magnetic attraction mechanism includes an attraction part provided in one of the plate roll and the plate holder and an attracted part provided in the other, and the attraction part includes a magnet.

16 Claims, 12 Drawing Sheets

(56) References Cited

U.S. PATENT DOCUMENTS

| | | | |
|---|---|---|---|
| 10,353,216 B2 | 7/2019 | Minamisawa et al. | |
| 10,649,226 B2 | 5/2020 | Minamisawa et al. | |
| 10,663,754 B2 | 5/2020 | Minamisawa | |
| 2017/0176766 A1* | 6/2017 | Sue | G02B 27/646 |
| 2018/0180900 A1* | 6/2018 | Chung | G02B 27/646 |
| 2018/0284570 A1* | 10/2018 | Minamisawa | H04N 5/2251 |
| 2018/0321506 A1* | 11/2018 | Minamisawa | H04N 5/23264 |
| 2020/0292841 A1* | 9/2020 | Sakae | H04N 5/225 |
| 2020/0393693 A1 | 12/2020 | Takei | |

FOREIGN PATENT DOCUMENTS

| | | |
|---|---|---|
| CN | 105247413 | 1/2016 |
| CN | 106324941 | 1/2017 |
| CN | 106353950 | 1/2017 |
| CN | 108073011 | 5/2018 |
| CN | 108873562 | 11/2018 |
| CN | 112083617 | 12/2020 |
| JP | 2015082072 | 4/2015 |
| JP | 2015121755 | 7/2015 |

\* cited by examiner

OPTICAL UNIT WITH SHAKE CORRECTION FUNCTION

CROSS REFERENCE TO RELATED APPLICATIONS

This application claims the priority benefit of Japanese Patent Application No. 2020-013333, filed on Jan. 30, 2020. The entirety of the above-mentioned patent application is hereby incorporated by reference herein and made a part of this specification.

TECHNICAL FIELD

The present invention relates to an optical unit with a shake correction function structured to perform a shake correction by turning a camera module around an optical axis.

BACKGROUND

In an optical unit which is mounted on a portable terminal or a movement body, in order to restrain disturbance of a photographed image of the portable terminal or when the movement body is moved, an optical unit has been known in which a movable body having a camera module is turnable around an optical axis, around a first axis perpendicular to the optical axis, and around a second axis perpendicular to the optical axis and the first axis. Such an optical unit with a shake correction function is disclosed in Japanese Patent Laid-Open No. 2015-82072 (Patent Literature 1).

An optical unit with a shake correction function described in Patent Literature 1 includes a movable body, a fixed body and a turning support mechanism structured to turnably support the movable body around a predetermined axial line with respect to the fixed body. The movable body includes a camera module having a lens, a support body which surrounds the camera module, and a gimbal mechanism structured to turnably support the camera module around a first axis and around a second axis on an inner side of the support body. Further, the optical unit with a shake correction function includes a turning magnetic drive mechanism structured to turn the camera module around the first axis and around the second axis in the movable body, and a rolling magnetic drive mechanism structured to turn the movable body around a predetermined axial line and thereby to turn the camera module around an optical axis.

In the optical unit with a shake correction function described in Patent Literature 1, when the camera module has not been turned around the first axis or around the second axis, the predetermined axial line (turning axis of the support body) around which the movable body is turned by the turning support mechanism and the optical axis are coincided with each other. However, when the camera module is turned around the first axis or around the second axis, the turning axis of the movable body by the turning support mechanism is deviated from the optical axis of the camera module mounted on the movable body. Therefore, when the camera module is turning around the first axis or around the second axis, if the rolling magnetic drive mechanism is driven to turn the movable body, a problem occurs that the camera module is not turned around the optical axis.

SUMMARY

In view of the problem described above, at least an embodiment of the present invention provides an optical unit with a shake correction function which is structured to turn a movable body around a turning axis which is coincided with an optical axis.

To solve the above-mentioned problem, at least an embodiment of the present invention may provide an optical unit with a shake correction function including a movable body having a camera module, a turning support mechanism which turnably supports the movable body around an optical axis of an optical element, a gimbal mechanism which turnably supports the turning support mechanism around a first axis intersecting the optical axis and turnably supports the turning support mechanism around a second axis intersecting the optical axis and the first axis, and a fixed body which supports the movable body through the gimbal mechanism and the turning support mechanism. The turning support mechanism includes a plate roll which is fixed to the movable body, a plate holder which is provided with a facing part which faces the plate roll in the optical axis direction and is supported by the gimbal mechanism in a turnable state around the first axis, a plurality of spherical bodies which are capable of rolling between the plate roll and the facing part, and a magnetic attraction mechanism structured to generate an attraction force so that the plate roll and the facing part come close to each other in the optical axis direction. The magnetic attraction mechanism includes an attraction part which is provided in a part in a circumferential direction around the optical axis in one of the plate roll and the plate holder, and an attracted part which is provided in a part in the circumferential direction in the other of the plate roll and the plate holder and is attracted by the attraction part, and the attraction part is provided with a magnet.

According to at least an embodiment of the present invention, the turning support mechanism which turnably supports the movable body around the optical axis is turnably supported by the gimbal mechanism around the first axis and around the second axis. Therefore, even in a state that the movable body is turning around the first axis or around the second axis, the movable body can be turned around a turning axis coincided with the optical axis. In this embodiment, the turning support mechanism includes a plurality of spherical bodies which are capable of rolling between the plate roll fixed to the movable body and the plate holder supported by the gimbal mechanism. Therefore, in the turning support mechanism, in order to maintain a state that the spherical bodies surely slidably contact with both of the plate roll and the plate holder, pressurization is required to generate for causing the plate roll and the plate holder to come close to each other in the optical axis direction. In accordance with at least an embodiment of the present invention, the magnetic attraction mechanism is provided. Therefore, pressurization is generated by an attraction force of the magnetic attraction mechanism. Further, in the magnetic attraction mechanism, each of the attraction part and the attracted part is provided in a part in the circumferential direction around the optical axis. Therefore, when the attracted part is attracted by the attraction part, an angular position of the plate roll with respect to the plate holder is restricted around the optical axis. In other words, according to at least an embodiment of the present invention, a reference angular position of the plate roll around the optical axis can be determined by the magnetic attraction mechanism.

In accordance with at least an embodiment of the present invention, the other of the plate roll and the plate holder is nonmagnetic, and the attracted part is provided with a magnetic member which is fixed to the other of the plate roll and the plate holder.

In accordance with at least an embodiment of the present invention, the other of the plate roll and the plate holder is nonmagnetic, and the attracted part is provided with a second magnet which is fixed to the other of the plate roll and the plate holder.

In accordance with at least an embodiment of the present invention, the other of the plate roll and the plate holder is structured of a magnetic portion made of magnetic material and a nonmagnetic portion made of nonmagnetic material, and the attracted part is the magnetic portion.

In accordance with at least an embodiment of the present invention, a length dimension in the circumferential direction of the attraction part and a length dimension in the circumferential direction of the attracted part are the same as each other. According to this structure, when the attracted part is attracted by the attraction part, a reference angular position of the plate roll is easily determined.

In accordance with at least an embodiment of the present invention, the magnet is polarized and magnetized in the circumferential direction. According to this structure, the reference angular position of the plate roll can be determined with the position of the magnetized polarizing line of the magnet as a reference.

In accordance with at least an embodiment of the present invention, the attraction part is provided on both sides with the optical axis interposed therebetween, and the attracted part is provided at a position where the attracted part faces the attraction part on each of both sides with the optical axis interposed therebetween. According to this structure, each of the attraction parts attracts each of the attracted parts and thus, the plate roll and the facing part are capable of coming close to each other around the optical axis in a well-balanced manner.

In accordance with at least an embodiment of the present invention, the plate roll is provided with a plate roll ring-shaped part which surrounds the optical axis, and a pair of plate roll extended parts which are protruded from the plate roll ring-shaped part to both sides in the second axis direction, and each of the pair of the plate roll extended parts is provided with a first plate roll extended portion which is extended from the plate roll ring-shaped part in the second axis direction, a second plate roll extended portion which is extended in the optical axis direction on an outer peripheral side with respect to the first plate roll extended portion and is fixed to the movable body, and a third plate roll extended portion which connects the first plate roll extended portion with the second plate roll extended portion. The plate holder is provided with a plate holder ring-shaped part which is coaxial with the plate roll ring-shaped part, and a pair of plate holder protruded parts which are protruded from the plate holder ring-shaped part to both sides in the second axis direction, and the spherical bodies are located between the plate roll ring-shaped part and the plate holder ring-shaped part. Further, one of each of a pair of the first plate roll extended portions and each of a pair of the plate holder protruded parts is provided with the attraction part, and the other of each of the pair of the first plate roll extended portions and each of the pair of the plate holder protruded parts is provided with the attracted part. According to this structure, the attraction parts and the attracted parts can be disposed on an outer peripheral side with respect to the plate roll ring-shaped part and the plate holder ring-shaped part between which the spherical bodies are rolled. Therefore, in comparison with a case that the attraction part and the attracted part are provided on an inner peripheral side with respect to the plate roll ring-shaped part and the plate holder ring-shaped part, the reference angular position of the plate roll is easily determined when the attracted part is attracted by the attraction part.

In accordance with at least an embodiment of the present invention, the plate roll is provided with a plate roll ring-shaped part which surrounds the optical axis, and plate roll protruded parts which are protruded from the plate roll ring-shaped part to both sides in the first axis direction, and the plate holder is provided with a plate holder ring-shaped part which is coaxial with the plate roll ring-shaped part, and a pair of plate holder extended parts which are protruded from the plate holder ring-shaped part to both sides in the first axis direction. Each of the pair of the plate holder extended parts is provided with a first plate holder extended portion which is extended from the plate holder ring-shaped part in the first axis direction, a second plate holder extended portion which is extended in the optical axis direction on an outer peripheral side with respect to the first plate holder extended portion and the movable body, and a third plate holder extended portion which connects the first plate holder extended portion with the second plate holder extended portion. The gimbal mechanism supports each of a pair of the second plate holder extended portions, the spherical bodies are located between the plate roll ring-shaped part and the plate holder ring-shaped part, one of each of a pair of the first plate holder extended portions and each of a pair of the plate roll protruded parts is provided with the attraction part, and the other of each of the pair of the first plate holder extended portions and each of the pair of the plate roll protruded parts is provided with the attracted part. According to this structure, the attraction parts and the attracted parts can be disposed on an outer peripheral side with respect to the plate roll ring-shaped part and the plate holder ring-shaped part between which the spherical bodies are rolled. Therefore, in comparison with a case that the attraction part and the attracted part are provided on an inner peripheral side with respect to the plate roll ring-shaped part and the plate holder ring-shaped part, the reference angular position of the plate roll is easily determined when the attracted part is attracted by the attraction part.

In this case, it may be structured that the optical unit with a shake correction function includes a first stopper member which is fixed to the plate roll, and the first stopper member is provided with one side stopper part which faces the plate holder extended part through a gap space from one side in the circumferential direction, and the other side stopper part which faces the plate holder extended part through a gap space from the other side in the circumferential direction. According to this structure, in a case that an impact is applied from the outside or the like, the plate roll can be prevented from being turned beyond a predetermined angular range. In other words, when the plate roll is going to turn beyond the predetermined angular range, the one side stopper part or the other side stopper part of the first stopper member fixed to the plate roll is abutted with the plate holder extended part to prevent further turning.

Further, in this case, it may be structured that the optical unit with a shake correction function includes a stopper member which is fixed to the plate roll, and the stopper member is provided with a stopper part which faces the facing part through a gap space on an opposite side to the plate roll with respect to the facing part in the optical axis direction, one side stopper part which faces the plate holder extended part through a gap space from one side in the circumferential direction, and the other side stopper part which faces the plate holder extended part through a gap space from the other side in the circumferential direction.

According to this structure, in a case that an impact is applied from the outside or the like, the plate roll can be prevented from being turned beyond a predetermined angular range. In other words, when the plate roll is going to turn beyond the predetermined angular range, the one side stopper part or the other side stopper part of the first stopper member fixed to the plate roll is abutted with the plate holder extended part to prevent further turning. Further, in a case that an impact is applied from the outside or the like, when the plate roll and the plate holder are going to separate from each other larger than a predetermined distance in the optical axis direction, the facing part of the plate holder is abutted with the stopper part of the stopper member fixed to the plate roll and thus, further movement of the plate holder is prevented. Therefore, the plate roll and the plate holder can be prevented from being excessively separated from each other in the optical axis direction and the spherical bodies can be prevented from being disengaged from therebetween.

In accordance with at least an embodiment of the present invention, the optical unit with a shake correction function includes a second stopper member which is fixed to the plate roll, and the second stopper member is provided with a stopper part which faces the facing part through a gap space on an opposite side to the plate roll with respect to the facing part in the optical axis direction. According to this structure, in a case that an impact is applied from the outside or the like, when the plate roll and the plate holder are going to separate from each other larger than a predetermined distance in the optical axis direction, the facing part of the plate holder is abutted with the stopper part of the second stopper member fixed to the plate roll and thus, further movement of the plate holder is prevented. Therefore, the plate roll and the plate holder can be prevented from being excessively separated from each other in the optical axis direction and the spherical bodies can be prevented from being disengaged from therebetween.

In accordance with at least an embodiment of the present invention, in order to support the turning support mechanism by the gimbal mechanism, the gimbal mechanism includes a gimbal frame, a first connection mechanism which turnably connects the plate holder with the gimbal frame around the first axis on an outer peripheral side in the first axis direction with respect to the movable body, and a second connection mechanism which turnably connects the gimbal frame with the fixed body around the second axis on an outer peripheral side in the second axis direction with respect to the movable body.

In accordance with at least an embodiment of the present invention, the optical unit with a shake correction function includes a shake correction magnetic drive mechanism structured to turn the movable body around the first axis and around the second axis, and a rolling correction magnetic drive mechanism structured to turn the movable body around the optical axis. The shake correction magnetic drive mechanism and the rolling correction magnetic drive mechanism are arranged in the circumferential direction around the optical axis. The shake correction magnetic drive mechanism includes a shake correction magnet which is fixed to one of the movable body and the fixed body, and a shake correction coil which is fixed to the other of the movable body and the fixed body. The rolling correction magnetic drive mechanism includes a rolling correction magnet which is fixed to one of the movable body and the fixed body, and a rolling correction coil which is fixed to the other of the movable body and the fixed body. In addition, the magnet is disposed at an angular position different from positions of the shake correction magnet and the rolling correction magnet around the optical axis. According to this structure, the magnetic attraction mechanism, the shake correction magnetic drive mechanism and the rolling correction magnetic drive mechanism can be restrained from mutually affecting each other.

Effects of the Invention

According to at least an embodiment of the present invention, the turning support mechanism which turnably supports the movable body around the optical axis is turnably supported around the first axis and around the second axis by the gimbal mechanism. Therefore, even in a state that the movable body is turning around the first axis or around the second axis, the movable body can be turned around a turning axis coincided with the optical axis. Further, the turning support mechanism includes the magnetic attraction mechanism which generates an attraction force causing the plate roll and the plate holder, which sandwich the spherical bodies, to come close to each other. Therefore, a state that the spherical bodies are slidably contacted with the plate roll and the plate holder can be maintained. In addition, the magnetic attraction mechanism includes an attraction part which is provided in a part in the circumferential direction around the optical axis in one of the plate roll and the plate holder, and an attracted part which is provided in a part in the circumferential direction in the other of the plate roll and the plate holder and is attracted by the attraction part. Therefore, when the attracted part is attracted by the attraction part, an angular position of the plate roll with respect to the plate holder is determined around the optical axis. In other words, a reference angular position of the plate roll around the optical axis can be determined by the magnetic attraction mechanism.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of an optical unit with a shake correction function to which the present invention is applied will be described below with reference to the accompanying drawings.

(Entire Structure)

Figure 1:
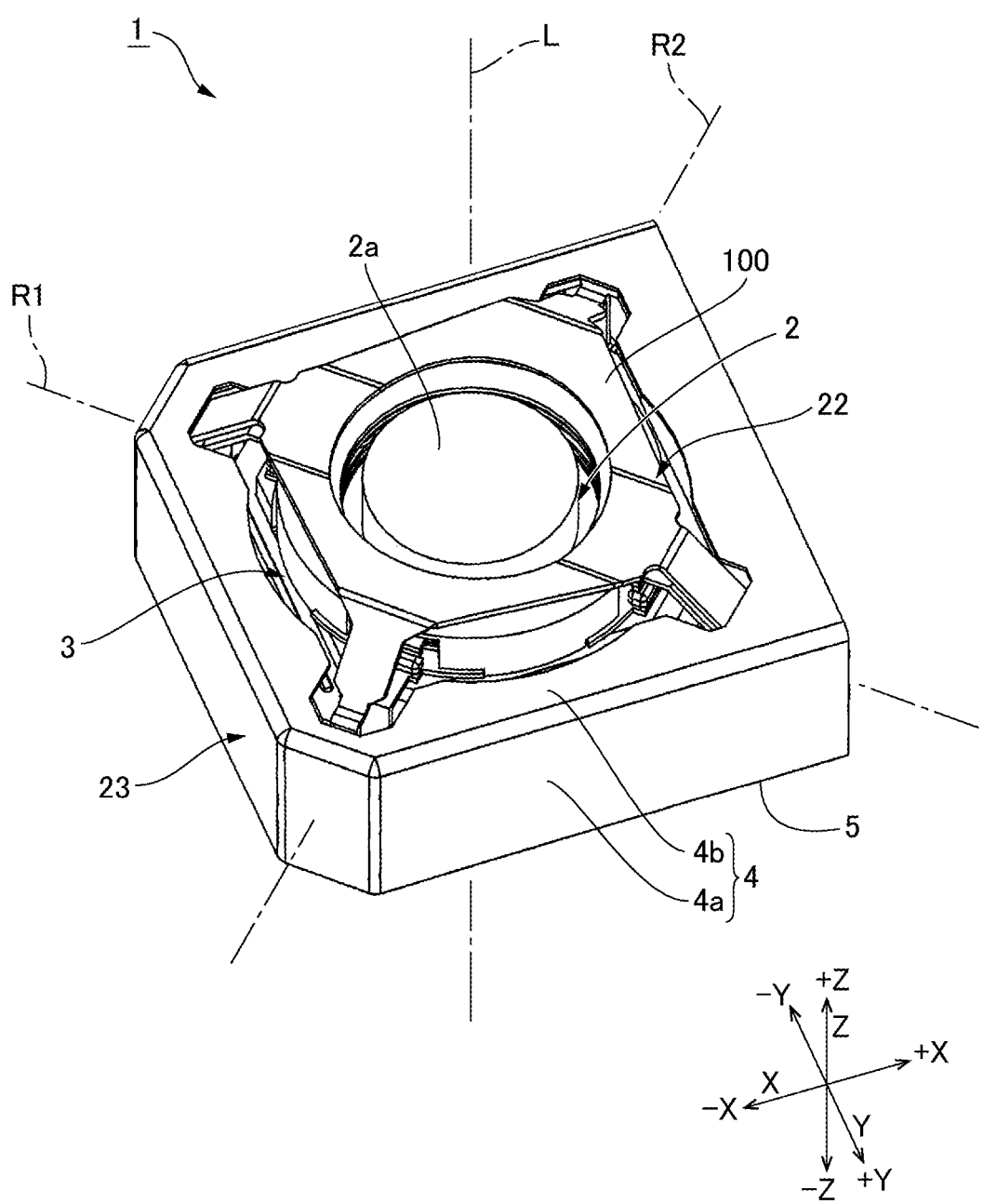
FIG. 1 is a perspective view showing an optical unit with a shake correction function.
Figure 2:
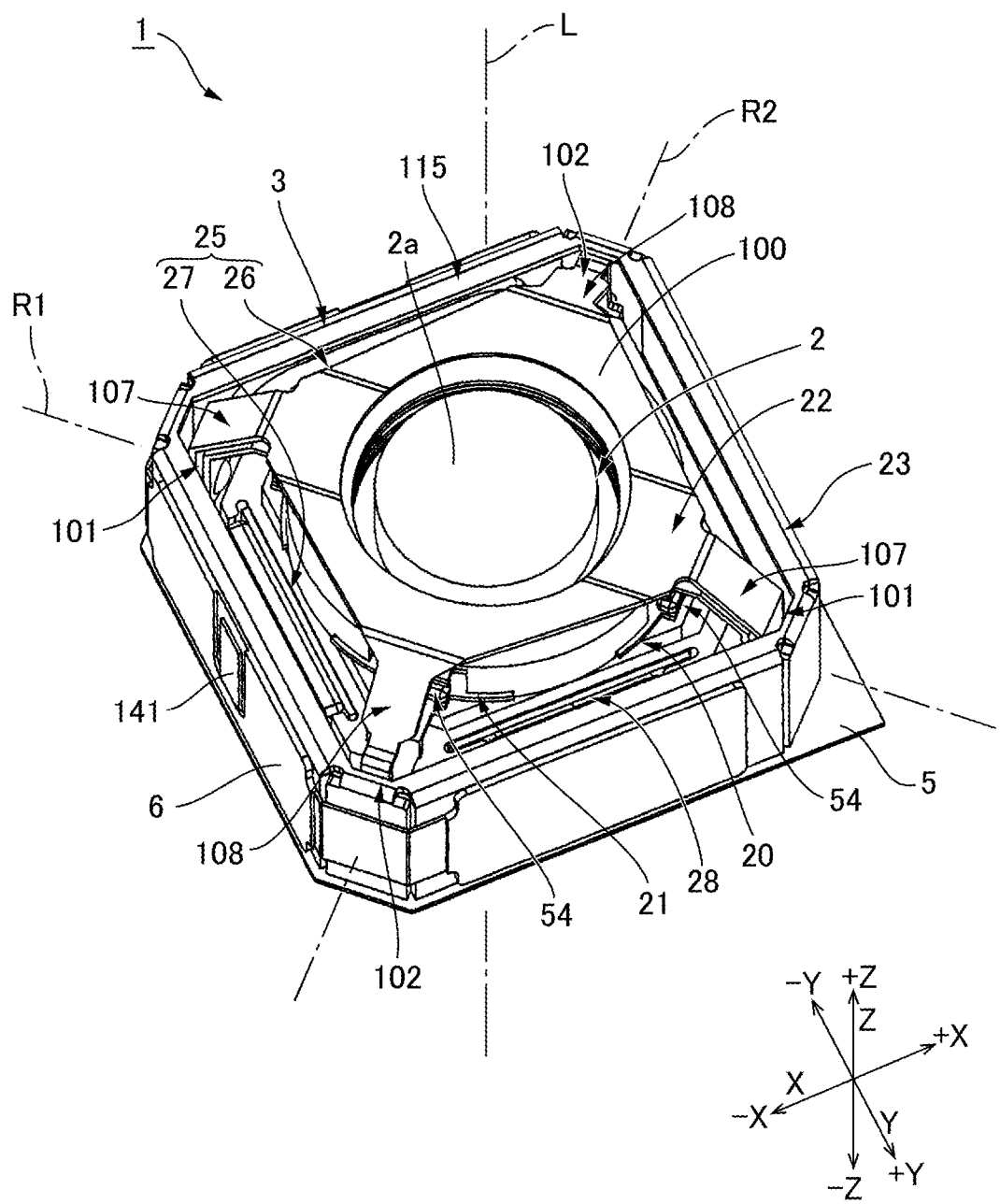
FIG. 2 is a perspective view showing an optical unit with a shake correction function from which a cover is detached.
Figure 3:
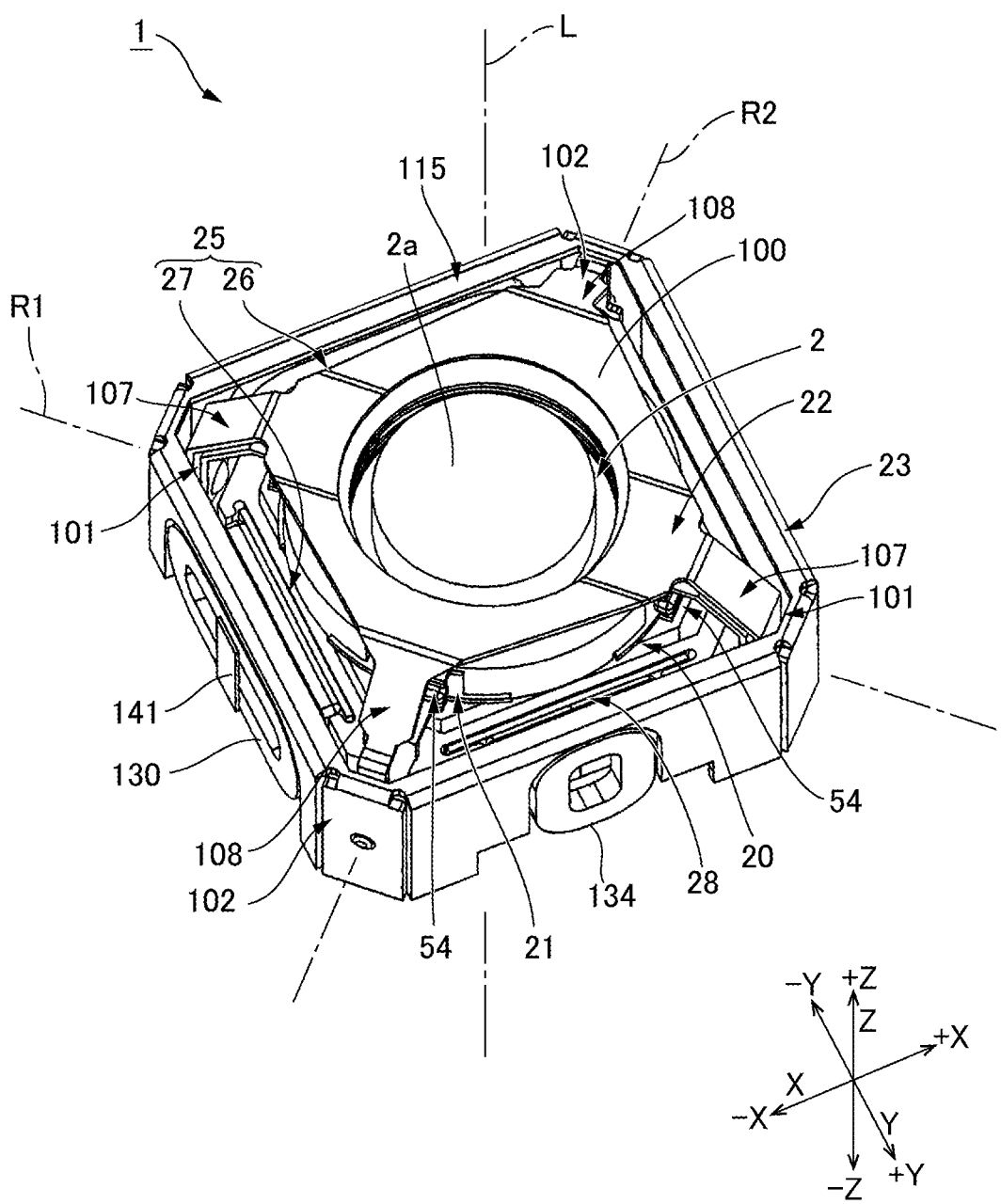
FIG. 3 is a perspective view showing an optical unit main body part.
Figure 4:
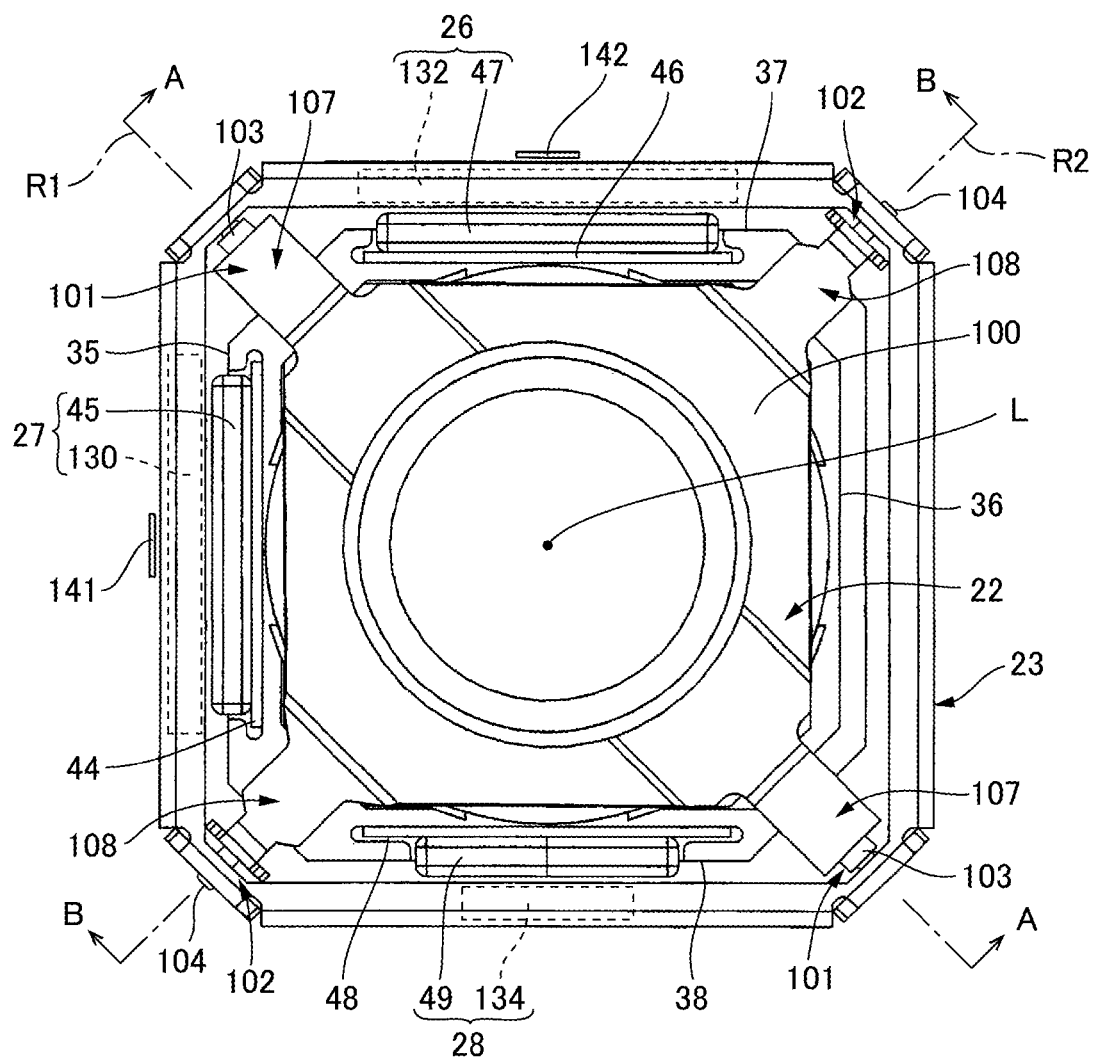
FIG. 4 is a plan view showing an optical unit main body part which is viewed in an optical axis direction.
Figure 5:
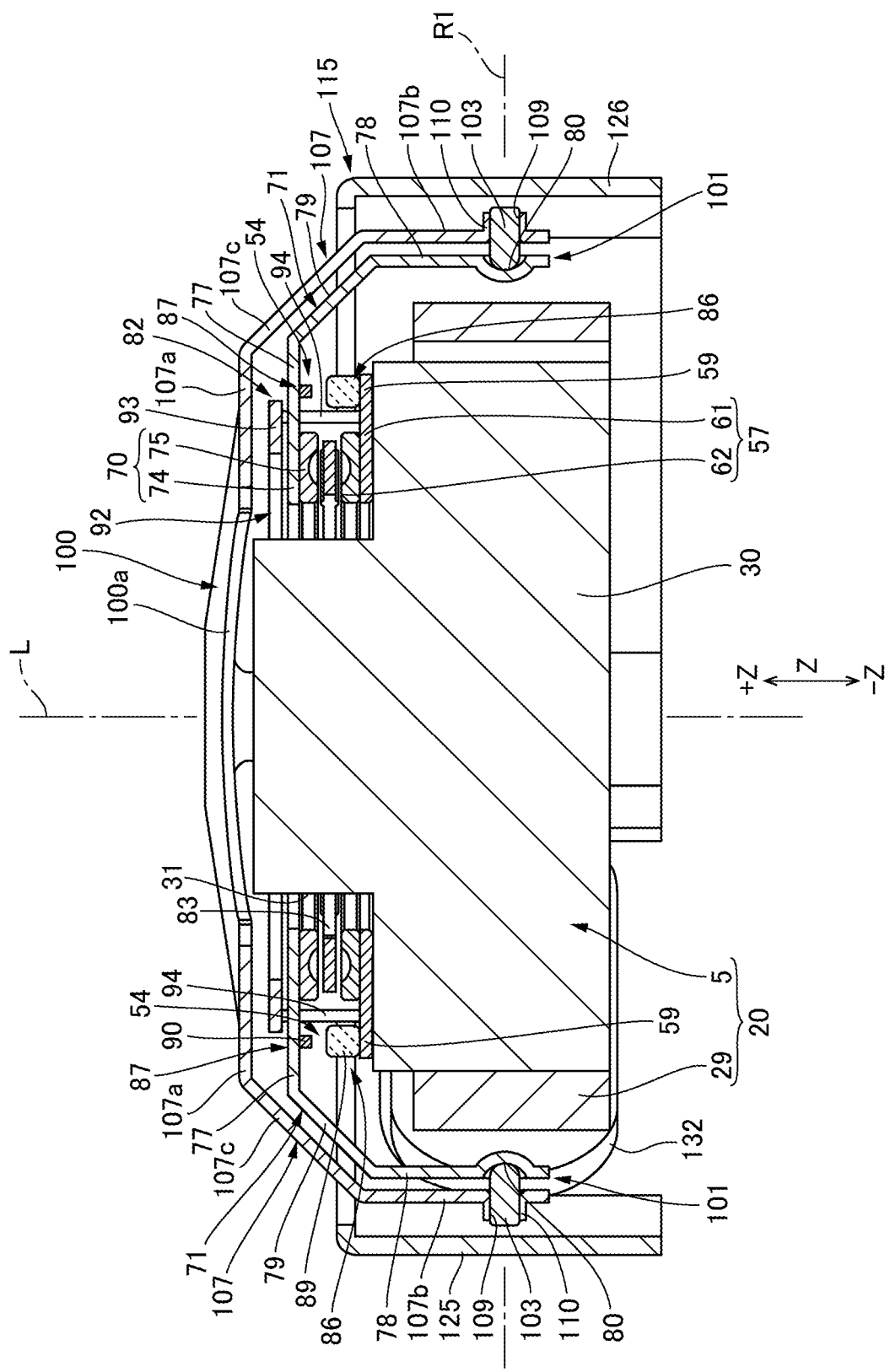
FIG. 5 is a cross-sectional view showing an optical unit main body part which is cut by the "A-A" line in FIG. 4.
Figure 6:
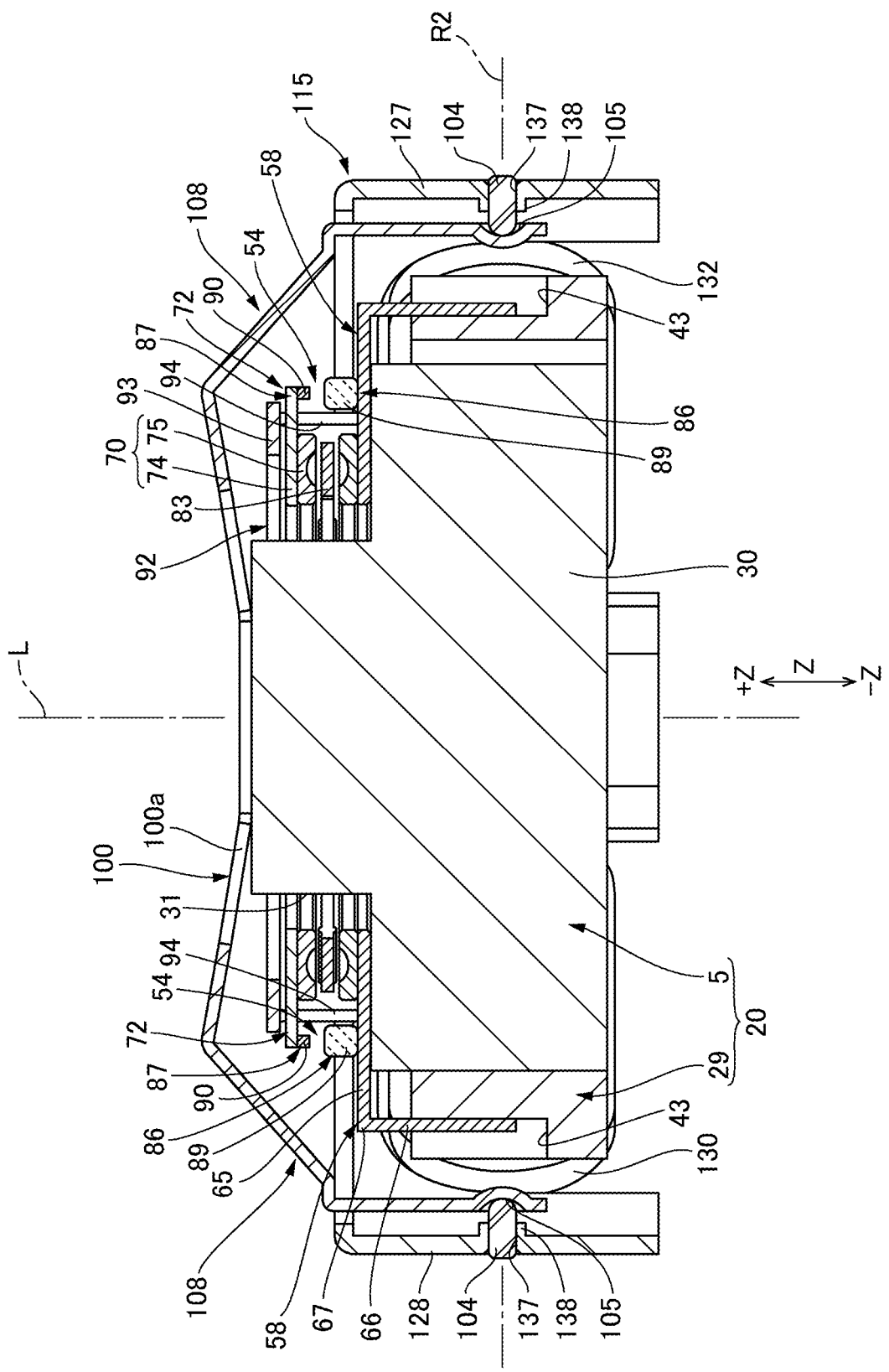
FIG. 6 is a cross-sectional view showing an optical unit main body part which is cut by the "B-B" line in FIG. 4.
Figure 7:
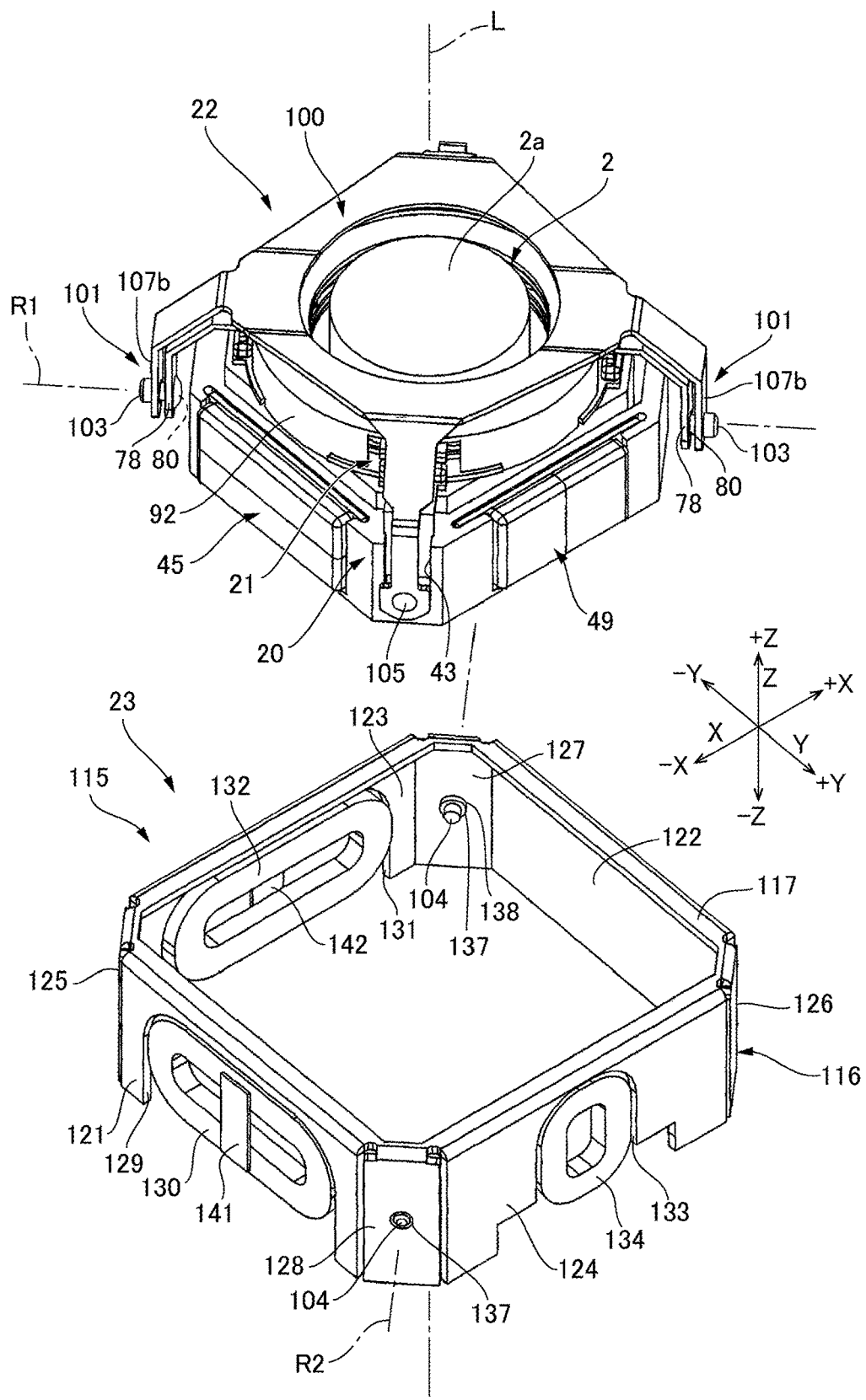
FIG. 7 is an exploded perspective view showing an optical unit main body part.

FIG. 1 is a perspective view showing an optical unit with a shake correction function. FIG. 2 is a perspective view showing an optical unit with a shake correction function from which a cover is detached. FIG. 3 is a perspective view showing an optical unit main body part. FIG. 4 is a plan view showing an optical unit main body part which is viewed in an optical axis direction. FIG. 5 is a cross-sectional view showing an optical unit main body part which is cut by the "A-A" line in FIG. 4. FIG. 6 is a cross-sectional view showing an optical unit main body part which is cut by the "B-B" line in FIG. 4. FIG. 7 is an exploded perspective view showing an optical unit main body part.

As shown in FIG. 1, an optical unit 1 with a shake correction function includes an optical unit main body part 3 having a camera module 2, a frame-shaped cover 4 which accommodates the optical unit main body part 3, and a base 5 which covers the optical unit main body part 3 from an image side. The cover 4 is provided with a frame part 4a which covers the optical unit main body part 3 from an outer peripheral side, and a frame plate part 4b which is protruded to an inner peripheral side from an end edge on an object side of the frame part 4a. As shown in FIG. 2, the base 5 is formed in a plate shape. The camera module 2 includes a lens 2a. Further, the camera module 2 includes an imaging element (not shown) in its inside. The optical unit main body part 3 includes a flexible printed circuit board 6 which is extended along its outer peripheral face.

The optical unit 1 with a shake correction function is, for example, used in an optical device such as a cell phone with a camera and a drive recorder or in an optical device, for example, an action camera mounted on a movement body such as a helmet, a bicycle, a radio-controlled helicopter or a wearable camera. In the optical device, when a shake is occurred in the optical device at a time of photographing, disturbance is generated in a photographed image. In order to avoid a photographed image being inclined, the optical unit 1 with a shake correction function corrects an inclination of the camera module 2 based on acceleration, angular velocity, shaking amount and the like detected by a detection means such as a gyroscope.

The optical unit 1 with a shake correction function in this embodiment performs a shake correction by turning the camera module 2 around an optical axis "L", around a first axis "R1" perpendicular to the optical axis "L", and around a second axis "R2" perpendicular to the optical axis "L" and the first axis "R1".

In the following descriptions, three axes perpendicular to each other are defined as an "X"-axis direction, a "Y"-axis direction and a "Z"-axis direction. Further, one side in the "X"-axis direction is referred to as a "−X" direction, and the other side is referred to as a "+X" direction. One side in the "Y"-axis direction is referred to as a "−Y" direction, and the other side is referred to as a "+Y" direction. One side in the "Z"-axis direction is referred to as a "−Z" direction, and the other side is referred to as a "+Z" direction. The "Z"-axis direction is an optical axis direction along the optical axis "L". The "−Z" direction is on an image side with respect to the camera module 2, and the "+Z" direction is on an object side with respect to the camera module 2. The first axis "R1" and the second axis "R2" are inclined by 45 degrees around the "Z"-axis (around the optical axis "L") with respect to the "X"-axis and the "Y"-axis.

As shown in FIGS. 3 and 4, the optical unit main body part 3 includes a movable body 20 having the camera module 2 and a turning support mechanism 21 structured to turnably support the movable body 20 around the optical axis "L". Further, the optical unit main body part 3 includes a gimbal mechanism 22 structured to turnably support the turning support mechanism 21 around the first axis "R1" and turnably support the turning support mechanism 21 around the second axis "R2", and a fixed body 23 which supports the movable body 20 through the gimbal mechanism 22 and the turning support mechanism 21. The movable body 20 is supported by the fixed body 23 in a turnable state around the first axis "R1" and around the second axis "R2" through the turning support mechanism 21 and the gimbal mechanism 22. The movable body 20 is turned around the "X"-axis and around the "Y"-axis by combining turning around the first axis "R1" with turning around the second axis "R2". In this manner, the optical unit 1 with a shake correction function performs a pitching correction around the "X"-axis, a yawing correction around the "Y"-axis, and a rolling correction around the "Z"-axis.

Further, the optical unit main body part 3 includes a correction magnetic drive mechanism 25 structured to turn the movable body 20 around the first axis "R1" and around the second axis "R2". The correction magnetic drive mechanism 25 includes a first shake correction magnetic drive mechanism 26 structured to generate a drive force to the movable body 20 around the "X"-axis and a second shake correction magnetic drive mechanism 27 structured to generate a drive force to the movable body 20 around the "Y"-axis. The first shake correction magnetic drive mechanism 26 and the second shake correction magnetic drive mechanism 27 are arranged in a circumferential direction around the optical axis "L". In this embodiment, the first shake correction magnetic drive mechanism 26 is disposed on the "−Y" direction side with respect to the camera module 2. The second shake correction magnetic drive mechanism 27 is disposed on the "−X" direction side with respect to the camera module 2.

In addition, the optical unit main body part 3 includes a rolling correction magnetic drive mechanism 28 structured to turn the movable body 20 around the optical axis "L". The first shake correction magnetic drive mechanism 26, the second shake correction magnetic drive mechanism 27 and the rolling correction magnetic drive mechanism 28 are arranged in the circumferential direction around the optical axis "L". In this embodiment, the rolling correction magnetic drive mechanism 28 is disposed on the "+Y" direction side with respect to the camera module 2. The rolling correction magnetic drive mechanism 28 and the first shake correction magnetic drive mechanism 26 are disposed at positions where they face each other with the optical axis "L" interposed therebetween.

(Movable Body)

Figure 8:
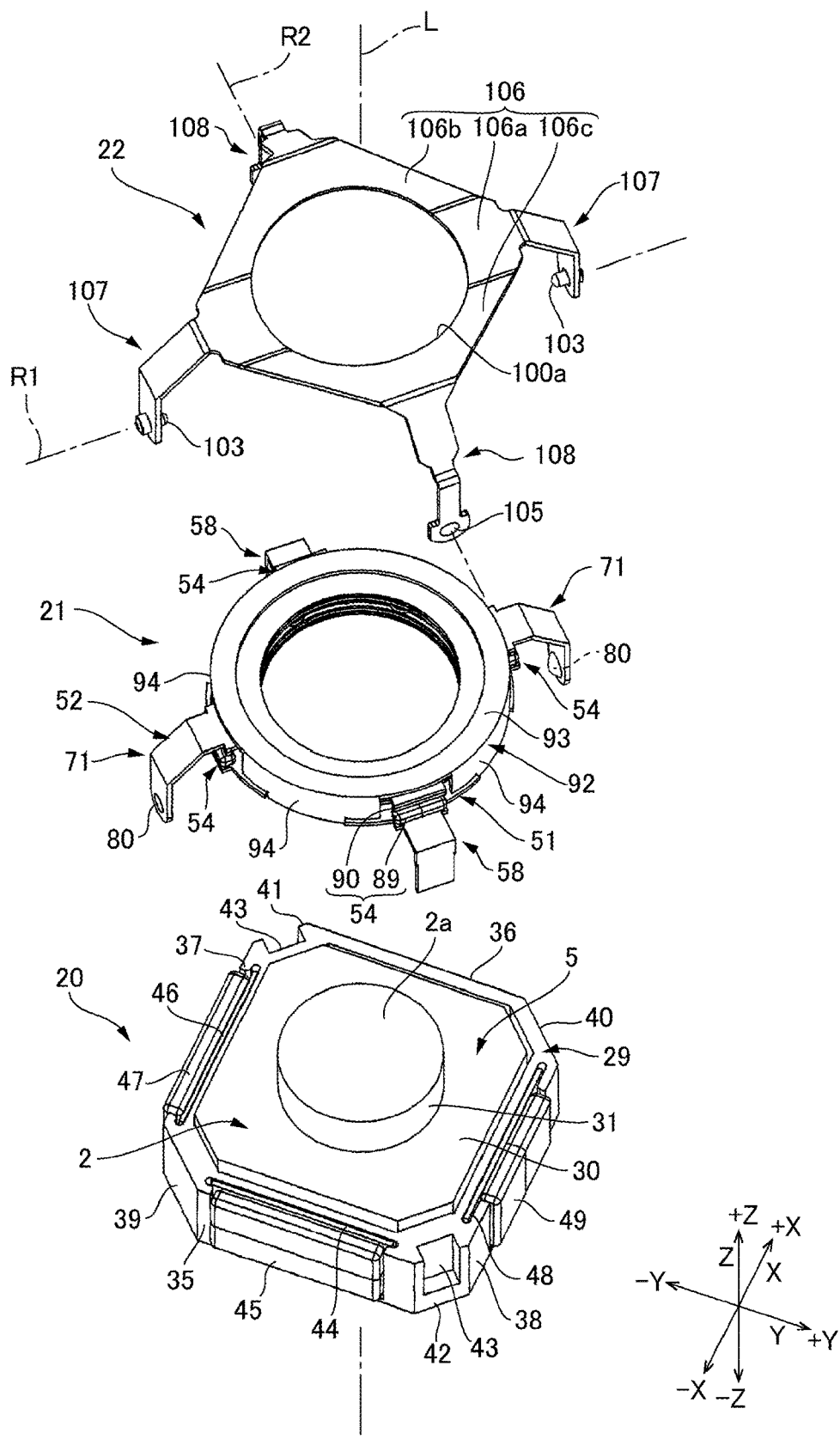
FIG. 8 is an explanatory view showing a movable body, a turning support mechanism and a gimbal mechanism.

FIG. 8 is an explanatory view showing the movable body 20, the turning support mechanism 21 and the gimbal mechanism 22. As shown in FIG. 8, the movable body 20 includes the camera module 2 and the frame-shaped holder 29. The camera module 2 is provided with a camera module main body part 30 and a cylindrical tube part 31 which is protruded to the "+Z" direction from a center of the camera module main body part 30. A lens 2a is accommodated in the cylindrical tube part 31. The holder 29 surrounds the camera module main body part 30 from an outer peripheral side.

A contour shape of the holder 29 when viewed from an upper side is substantially octagonal. The holder 29 is provided with a first side wall 35 and a second side wall 36 which are extended in parallel to the "Y" direction, and a third side wall 37 and a fourth side wall 38 which are extended in parallel to the "X" direction. The first side wall 35 is located on the "−X" direction side with respect to the second side wall 36. The third side wall 37 is located on the "−Y" direction side with respect to the fourth side wall 38. Further, the holder 29 is provided with a fifth side wall 39 and a sixth side wall 40 which are located at diagonal positions in the first axis "R1" direction, and a seventh side wall 41 and an eighth side wall 42 which are located at diagonal positions in the second axis "R2" direction. The fifth side wall 39 is located on the "−X" direction side with respect to the sixth side wall 40. The seventh side wall 41 is located on the "−Y" direction side with respect to the eighth side wall 42.

As shown in FIGS. 4 and 8, the first side wall 35 of the movable body 20 is fixed with a first magnet 45 through a first yoke 44 in a plate shape which is made of magnetic material. The first magnet 35 is divided into two pieces in the "Z"-axis direction. The third side wall 37 of the movable body 20 is fixed with a second magnet 47 through a second yoke 46 in a plate shape which is made of magnetic material. The first magnet 45 and the second magnet 47 are disposed so that the same poles are directed to the "Z"-axis direction. The second magnet 47 is divided into two pieces in the "Z"-axis direction. The fourth side wall 38 of the movable body 20 is fixed with a third magnet 49 through a third yoke 48 in a plate shape which is made of magnetic material. The third magnet 49 is divided into two pieces in the circumferential direction.

The first magnet 45 and the second magnet 47 are shake correction magnets of the shake correction magnetic drive mechanism 25 for turning the movable body 20 around the first axis "R1" and around the second axis "R2". The shake correction magnetic drive mechanism 25 includes, as shake correction magnets, the first magnet 45 and the second magnet 47 which are arranged in the circumferential direction with the first axis "R1" interposed therebetween. Further, the third magnet 49 is a rolling correction magnet of the rolling correction magnetic drive mechanism 28 for turning the movable body 20 around the optical axis "L". The third magnet 49 is disposed on an opposite side to the second magnet 47 with the optical axis "L" interposed therebetween.

As shown in FIG. 8, a cut-out part 43 which is extended from the "+Z" direction side to the "−Z" direction is provided in the seventh side wall 41 and the eighth side wall 42 of the movable body 20.

(Turning Support Mechanism)

Figure 9:
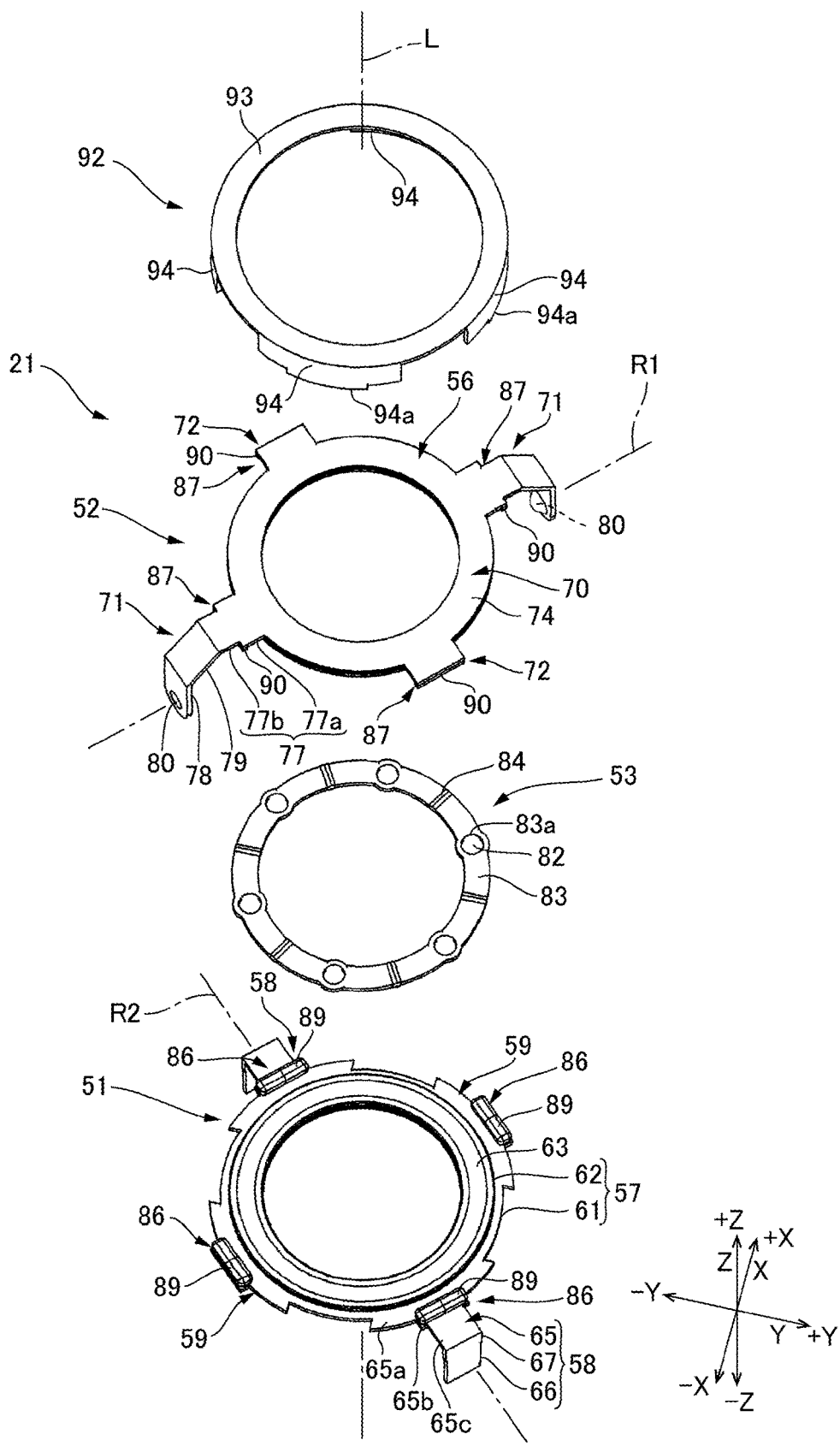
FIG. 9 is an exploded perspective view showing a turning support mechanism which is viewed from one side in an optical axis direction.
Figure 10:
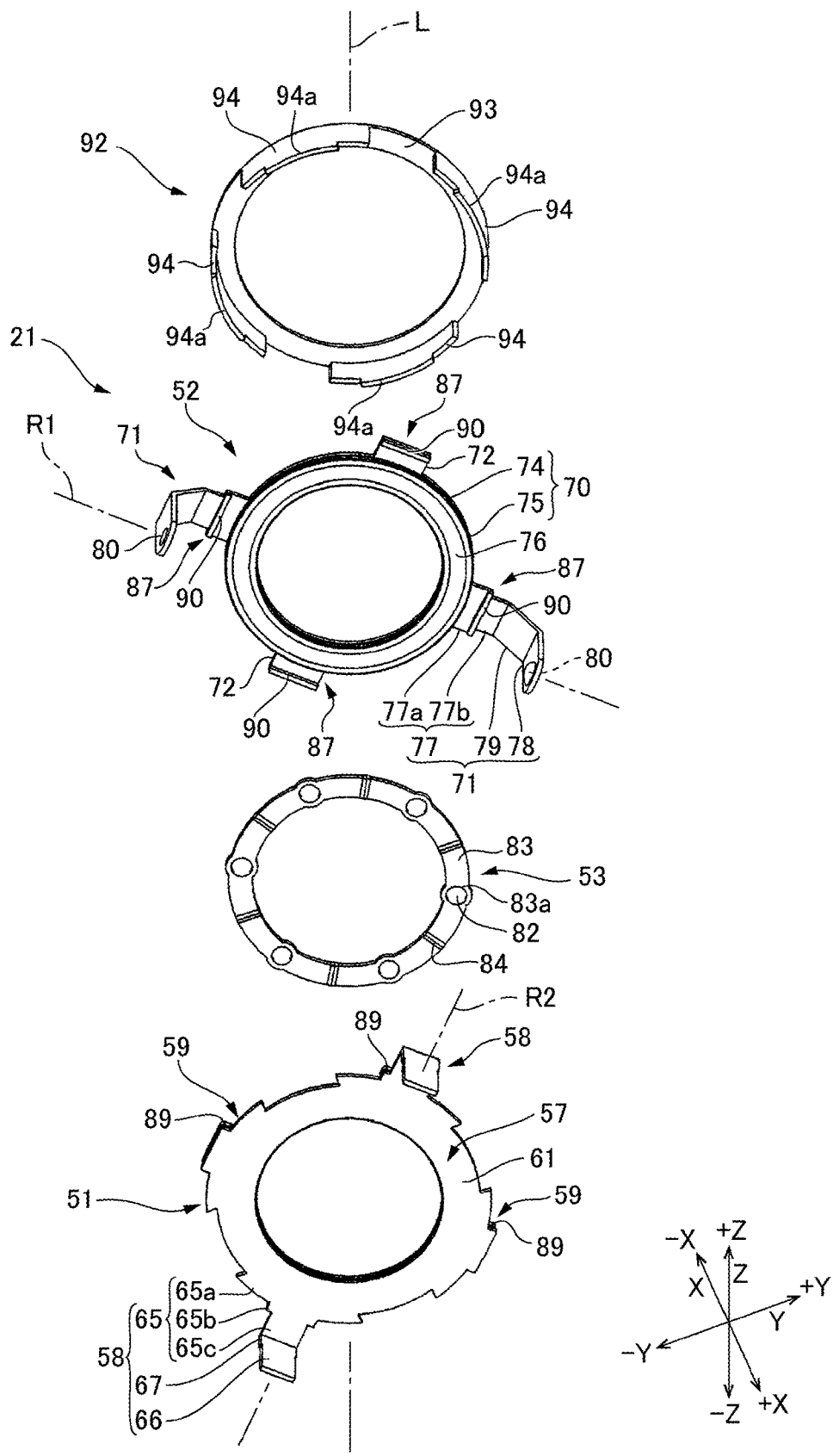
FIG. 10 is an exploded perspective view showing a turning support mechanism which is viewed from the other side in an optical axis direction.

FIG. 9 is an exploded perspective view showing the turning support mechanism 21 which is viewed from the "+Z" direction side. FIG. 10 is an exploded perspective view showing the turning support mechanism 21 which is viewed from the "−Z" direction side. As shown in FIGS. 9 and 10, the turning support mechanism 21 includes a plate roll 51 which is fixed to the movable body 20, a plate holder 52 provided with a facing part 56 which faces the plate roll 51 in the "Z"-axis direction, and a turning mechanism 53 structured to make the plate roll 51 and the plate holder 52 be turnable around the optical axis "L". Further, as shown in FIGS. 5 and 6, the turning support mechanism 21 includes a magnetic attraction mechanism 54 structured to generate an attraction force so that the plate roll 51 and the facing part 56 come close to each other in the "Z"-axis direction.

The plate roll 51 is made of metal and is structured of nonmagnetic material. As shown in FIG. 9, the plate roll 51 is provided with a plate roll ring-shaped part 57 surrounding the optical axis "L" and a pair of plate roll extended parts 58 which are protruded from the plate roll ring-shaped part 57 to both sides in the second axis "R2" direction and are extended to the "−Z" direction. Further, the plate roll 51 is provided with a pair of plate roll protruded parts 59 which are protruded from the plate roll ring-shaped part 57 to both sides in the first axis direction. In this embodiment, the plate roll ring-shaped part 57 is structured of a plate roll ring-shaped plate 61, which is integrally formed with a pair of the plate roll extended parts 58, and a plate roll ring-shaped member 62 which is coaxially fixed to a face on the "+Z" direction side of the plate roll ring-shaped plate 61. An outer diameter dimension of the plate roll ring-shaped plate 61 is larger than an outer diameter dimension of the plate roll ring-shaped member 62. Therefore, the plate roll ring-shaped plate 61 is projected to an outer peripheral side with respect to the plate roll ring-shaped member 62. A plate roll ring-shaped groove 63 is provided on an end face on the "+Z" direction side of the plate roll ring-shaped member 62.

Each of a pair of the plate roll extended parts 58 is provided with a first plate roll extended portion 65, which is extended in the second axial direction from the plate roll ring-shaped plate 61, a second plate roll extended portion 66 which is extended in the optical axis direction on an outer peripheral side with respect to the first plate roll extended portion 65, and a third plate roll extended portion 67 which connects the first plate roll extended portion 65 with the second plate roll extended portion 66. The third plate roll extended portion 67 is a bent portion which is bent between the first plate roll extended portion 65 and the second plate roll extended portion 66.

The first plate roll extended portion 65 is provided, in order from a side of the plate roll ring-shaped plate 61, with a base part 65a whose width in the circumferential direction is wide, an intermediate part 65b whose width is narrower than the base part 65a, and a tip end part 65c whose width is narrower than the intermediate part 65b. The tip end part 65c is continuously connected with the second plate roll extended portion 66 through the third plate roll extended portion 67. The second plate roll extended portion 66 is, as can be seen in FIGS. 7 and 8, inserted into the cut-out part 43 provided in each of the seventh side wall 41 and the eighth side wall 42 of the movable body 20 and the second plate roll extended portions 66 are fixed to the movable body 20.

As shown in FIG. 10, the plate holder 52 is made of metal and structured of nonmagnetic material. The plate holder 52 is provided with a plate holder ring-shaped part 70, a pair of plate holder extended parts 71 which are protruded from the plate holder ring-shaped part 70 to both sides in the first axis "R1" direction and extended to the "−Z" direction, and a pair of plate holder protruded parts 72 which are protruded from the plate holder ring-shaped part 70 to both sides in the second axial direction. In this embodiment, the plate holder ring-shaped part 70 is structured of a plate holder ring-shaped plate 74 which is integrally formed of a pair of the plate holder extended parts 71, and a plate holder ring-shaped member 75 which is coaxially fixed to a face on the "−Z" direction side of the plate holder ring-shaped plate 74. A plate holder circular arc groove 76 is provided on an end face on the "−Z" direction side of the plate holder ring-shaped member 75. In this embodiment, the plate roll ring-shaped member 62 and the plate holder ring-shaped member 75 are the same member as each other. The plate roll ring-shaped groove 63 and the plate holder circular arc groove 76 are coaxial with each other and face each other in the "Z"-axis direction.

Each of a pair of the plate holder extended parts 71 is provided with a first plate holder extended portion 77, which is extended from the plate holder ring-shaped part 70 to both sides in the first axis "R1" direction, a second plate holder extended portion 78 which is extended in the "Z"-axis direction on an outer peripheral side with respect to the first plate holder extended portion 77 and the movable body 20, and a third plate holder extended portion 79 which connects the first plate holder extended portion 77 with the second plate holder extended portion 78. The third plate holder extended portion 79 is inclined to the "−Z" direction toward the outer peripheral side. The first plate holder extended portion 77 is provided, in order from a side of the plate holder ring-shaped plate 74, with a base part 77a whose width in the circumferential direction is wide, and a tip end part 77b whose width is narrower than the base part 77a. The tip end part 77b is continuously connected with the second plate holder extended portion 78 through the third plate holder extended portion 79.

As shown in FIG. 5, the second plate holder extended portion 78 is located on an outer peripheral side in the first axis "R1" direction with respect to the movable body 20. The second plate holder extended portion 78 faces the movable body 20 through a slight gap space. Each of the second plate holder extended portions 78 is provided with a first axis side concave curved face 80 which is recessed to an inner side in the radial direction (to a side of the movable body 20) on the first axis "R1" line.

As shown in FIGS. 9 and 10, the turning mechanism 53 includes a plurality of spherical bodies 82 and a retainer 83. The spherical body 82 is made of metal. The retainer 83 is made of resin. The retainer 83 is provided with a plurality of spherical body holding holes 83a each of which holds each of a plurality of the spherical bodies 82 so as to be capable of rolling. In this embodiment, the turning mechanism 53 includes six spherical bodies 82. Therefore, the retainer 83 is provided with six spherical body holding holes 83a. The spherical body 82 is held on an inner side of the spherical body holding hole 83a so as to be capable of rolling and protrudes to the "−Z" direction and to the "+Z" direction from the retainer 83. The retainer 83 is provided with projections 84 each of which is protruded to the "+Z" direction and to the "−Z" direction at a middle position between the spherical body holding holes 83a in the circumferential direction. Each of the projections 84 is extended in the radial direction.

The plate roll 51 and the plate holder 52 are structured so that the plate roll ring-shaped part 57 and the plate holder ring-shaped part 70 are coaxially overlapped with each other. When the plate holder 52 is to be overlapped, the respective spherical bodies 82 and the retainer 83 are disposed between the plate holder ring-shaped part 70 and the plate roll ring-shaped part 57 in the "Z"-axis direction. Each of the spherical bodies 82 is inserted into the plate roll ring-shaped groove 63 and the plate holder circular arc groove 76. The plate holder ring-shaped part 70, a pair of the first plate holder extended portions 77 and a pair of the plate holder protruded parts 72 are facing parts 56 which respectively face the plate roll ring-shaped part 57, a pair of the plate roll protruded parts 59 and a pair of the first plate roll extended portions 65 in the "Z"-axis direction.

In this embodiment, the magnetic attraction mechanism 54 structured to attract the plate holder ring-shaped part 70 and the plate roll ring-shaped part 57 in a direction approaching each other in the "Z"-axis direction includes an attraction part 86 which is provided in a part in the circumferential direction of the plate roll 51 around the optical axis "L", and an attracted part 87 which is provided in a part in the circumferential direction of the plate holder 52 and is attracted by the attraction part 86. As shown in FIG. 5, the attraction part 86 is provided on both sides in the first axis "R1" direction with the optical axis "L" interposed therebetween. Further, as shown in FIG. 6, the attraction part 86 is provided on both sides in the second axis "R2" direction with the optical axis "L" interposed therebetween. Therefore, the attraction part 86 is provided at four positions around the optical axis "L" at equal angular intervals. Similarly, the attracted part 87 is provided on both sides in the second axis "R2" direction with the optical axis "L" interposed therebetween. Further, the attracted part 87 is provided on both sides in the first axis "R1" direction with the optical axis "L" interposed therebetween. Therefore, the attracted part 87 is provided at four positions around the optical axis "L" at equal angular intervals.

More specifically, as shown in FIG. 9, the attraction part 86 is provided in each of the intermediate parts 65b of a pair of the first plate roll extended portions 65 and in each of a pair of the plate roll protruded parts 59. The attraction part 86 is provided with a magnet 89 which is fixed to the intermediate part 65b of each of the first plate roll extended portions 65 and each of the plate roll protruded parts 59. In this embodiment, the magnet 89 is polarized and magnetized in the circumferential direction. The attracted part 87 is, as shown in FIG. 10, provided in each of the base parts 77a of a pair of the first plate holder extended portions 77 and in each of a pair of the plate holder protruded parts 72. The attracted part 87 is provided with a magnetic member 90 which is fixed to the base part 77a of each of the first plate holder extended portions 77 and each of the plate holder protruded parts 72. The magnetic member 90 is formed in a quadrangular cubic shape and is extended in the circumferential direction. A length dimension in the circumferential direction of the magnetic member 90 is the same as a length dimension in the circumferential direction of the magnet 89. In other words, a length dimension in the circumferential direction of the attraction part 86 is the same as a length dimension in the circumferential direction of the attracted part 87.

As shown in FIGS. 5 and 6, when the plate roll ring-shaped part 57 and the plate holder ring-shaped part 70 are coaxially overlapped with each other, the attraction part 86 provided in each of the intermediate parts 65b of a pair of the first plate roll extended portions 65 faces the attracted part 87 provided in each of a pair of the plate holder protruded parts 72 in the "Z"-axis direction. Further, the attraction part 86 provided in each of a pair of the plate roll protruded parts 59 faces the attracted part 87 provided in each of the base parts 77a of a pair of the first plate holder extended portions 77.

In this embodiment, a stopper member 92 is fixed to the plate roll 51. The stopper member 92 is provided with a ring-shaped plate part 93 coaxially disposed with the plate holder ring-shaped part 70, and four circular arc walls 94 which are extended to the "−Z" direction from four positions in the circumferential direction of an outer circumferential edge of the ring-shaped plate part 93. The four circular arc walls 94 are provided at equal angular intervals. Each of the circular arc walls 94 is provided with a protruded part 94*a* at a center portion in the circumferential direction of an end edge on the "−Z" direction side. The protruded parts 94*a* of the respective circular arc walls 94 of the stopper member 92 are inserted between a pair of the first plate roll extended portions 65 of the plate roll 51 and a pair of the plate roll protruded parts 59, and the stopper member 92 is fixed to the plate roll ring-shaped part 57 by welding or the like.

In a state that the stopper member 92 is fixed to the plate roll 51, as shown in FIGS. 5 and 8, the first plate holder extended portion 77 of the plate holder extended part 71 is located between two circular arc walls 94 adjacent to each other in the circumferential direction. In this embodiment, the circular arc wall 94 (one side stopper part) located on one side in the circumferential direction with respect to the first plate holder extended portion 77 faces the plate holder extended part 71 from the one side in the circumferential direction through a gap space. Further, the circular arc wall 94 (the other side stopper part) located on the other side in the circumferential direction with respect to the first plate holder extended portion 77 faces the plate holder extended part 71 from the other side in the circumferential direction through a gap space. Further, when a state that the stopper member 92 is fixed to the plate roll 51 is viewed in the "Z"-axis direction, the ring-shaped plate part 93 (stopper part) faces the plate holder ring-shaped part 70 through a gap space on an opposite side to the plate roll 51 with respect to the plate holder ring-shaped part 70 (facing part) in the "Z"-axis direction.

(Gimbal Mechanism)

Figure 11:
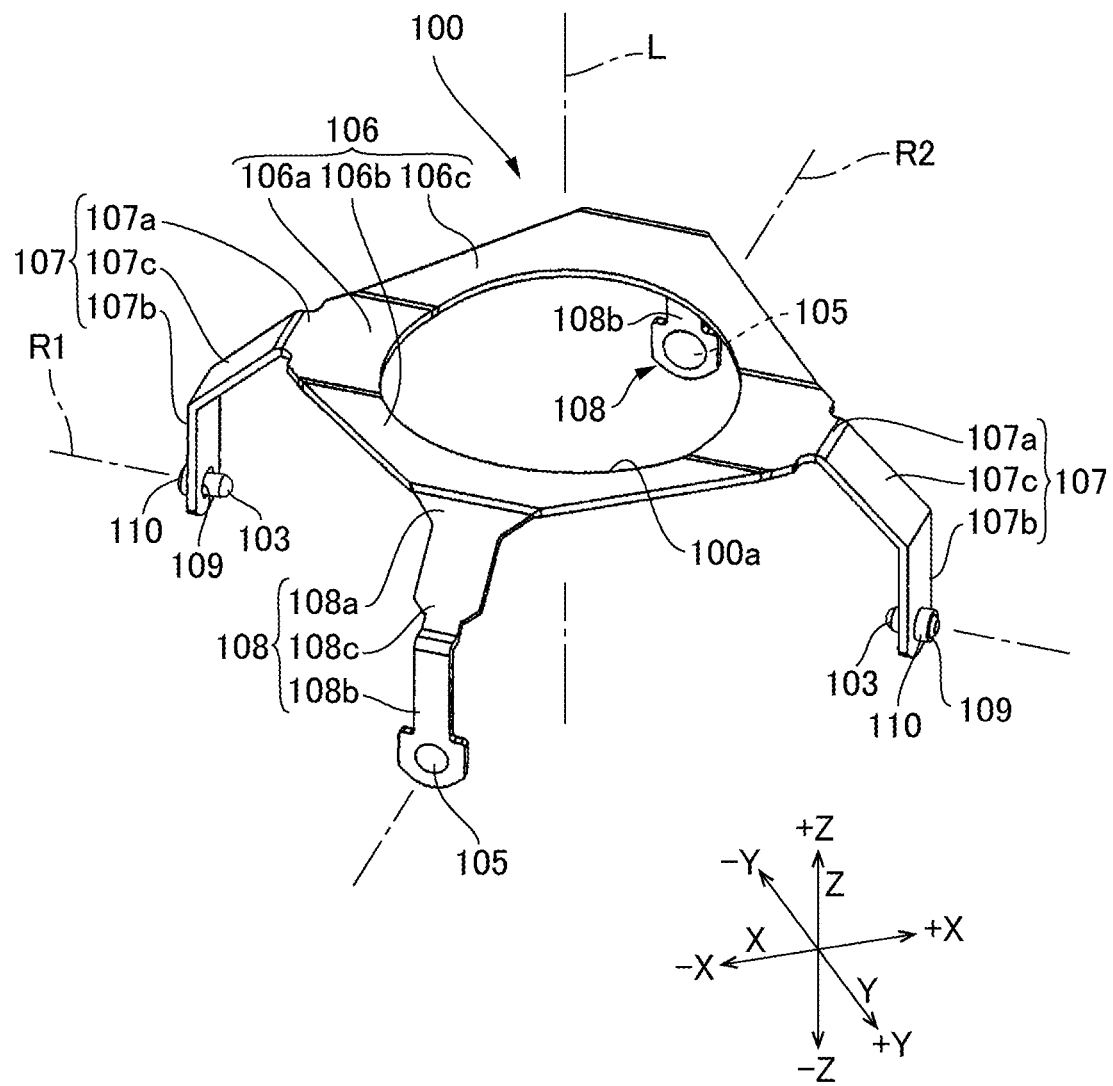
FIG. 11 is a perspective view showing a gimbal frame and a first axis side shaft.

FIG. 11 is a perspective view showing a gimbal frame and a first axis side shaft. As shown in FIG. 4, a gimbal mechanism 22 includes a gimbal frame 100 and a first connection mechanism 101 which turnably connects the gimbal frame 100 with the plate holder 52 around the first axis "R1". Further, the gimbal mechanism 22 includes a second connection mechanism 102 which turnably connects the gimbal frame 100 with the fixed body 23 around the second axis "R2". As shown in FIG. 5, the first connection mechanism 101 includes a first axis side shaft 103 protruded from the gimbal frame 100 to a side of the plate holder 52 on the first axis "R1", and a first axis side concave curved face 80 which is provided in the plate holder 52 and is turnably contact with a tip end of the first axis side shaft 103. As shown in FIG. 6, the second connection mechanism 102 includes a second axis side shaft 104 protruded from the fixed body 23 to a side of the gimbal frame 100 on the second axis "R2", and a second axis side concave curved face 105 which is provided in the gimbal frame 100 and is contacted with a tip end of the second axis side shaft 104.

(Gimbal Frame)

The gimbal frame 100 is structured of a plate spring made of metal. As shown in FIGS. 8 and 11, the gimbal frame 100 is provided with a gimbal frame main body part 106 located on the "+Z" direction side with respect to the plate holder 52, a pair of first axis side gimbal frame extended parts 107 which are protruded from the gimbal frame main body part 106 to both sides in the first axis "R1" direction and are extended to the "−Z" direction side, and a pair of second axis side gimbal frame extended parts 108 which are protruded from the gimbal frame main body part 106 to both sides in the second axis "R2" direction and are extended to the "−Z" direction side. The gimbal frame main body part 106 is provided with a center plate portion 106*a* in a substantially rectangular shape extended in the first axis "R1" direction, a first inclined plate portion 106*b* which is inclined to the "+Z" direction from one side ("−Y" direction side) in the second axis "R2" direction of the center plate portion 106*a*, and a second inclined plate portion 106*c* which is inclined to the "+Z" direction from the other side ("+Y" direction side) in the second axis "R2" direction of the center plate portion 106*a*. Further, the gimbal frame main body part 106 is provided at its center with an opening part 100*a* which penetrates in the "Z"-axis direction. The cylindrical tube part 31 of the camera module 2 is inserted into the opening part 100*a*.

As shown in FIG. 11, each of a pair of the first axis side gimbal frame extended parts 107 is provided with a first portion 107*a* of the first axis side gimbal frame extended part which is extended in the first axis "R1" direction so as to be separated from the gimbal frame main body part 106, a second portion 107*b* of the first axis side gimbal frame extended part which is extended in the "Z"-axis direction on an outer peripheral side with respect to the first portion 107*a* of the first axis side gimbal frame extended part and the movable body 20, and a third portion 107*c* of the first axis side gimbal frame extended part which connects the first portion 107*a* of the first axis side gimbal frame extended part with the second portion 107*b* of the first axis side gimbal frame extended part.

As shown in FIG. 11, the first portion 107*a* of the first axis side gimbal frame extended part is protruded from the center plate portion 106*a* in the first axis "R1" direction. The third portion 107*c* of the first axis side gimbal frame extended part is inclined to the "−Z" direction from a tip end edge of the first portion 107*a* of the first axis side gimbal frame extended part toward an outer peripheral side. The second portion 107*b* of the first axis side gimbal frame extended part is provided with a gimbal frame extended part through hole 109 which penetrates in the first axis "R1" direction. Further, the second portion 107*b* of the first axis side gimbal frame extended part is provided with a first axis side shaft supporting tube part 110 which is protruded from an opening edge of the gimbal frame extended part through hole 109 to the outer peripheral side in the first axis "R1" direction.

In this embodiment, the first axis side shaft 103 is supported by the gimbal frame extended part through hole 109 and the first axis side shaft supporting tube part 110. As shown in FIG. 5, the first axis side shaft 103 is extended on the first axis "R1" in the first axis "R1" direction. An end part on an inner peripheral side of the first axis side shaft 103 is protruded from the second portion 107*b* of the first axis side gimbal frame extended part toward the second plate holder extended portion 78 of the plate holder extended part 71. The end part on the inner peripheral side of the first axis side shaft 103 is provided with a hemispherical face.

Next, each of a pair of the second axis side gimbal frame extended parts 108 is, as shown in FIG. 11, provided with a first portion 108*a* of the second axis side gimbal frame extended part extended in a separating direction from the gimbal frame main body part 106 in the second axis "R2" direction, a second portion 108*b* of the second axis side gimbal frame extended part extended in the "Z"-axis direction on an outer peripheral side with respect to the first portion 108*a* of the second axis side gimbal frame extended part and the movable body 20, and a third portion 108*c* of the second axis side gimbal frame extended part which connects the first portion 108*a* of the second axis side gimbal frame extended part with the second portion 108*b* of the second axis side gimbal frame extended part. A pair of the first portions 108*a* of the second axis side gimbal frame extended parts is protruded in the second axis "R2" direction from respective end edges on outer peripheral sides of the first inclined plate portion 106b and the second inclined plate portion 106c. The third portion 108c of the second axis side gimbal frame extended part is provided with an inclined portion which is inclined to the "−Z" direction from a tip end edge of the first portion 108a of the second axis side gimbal frame extended part toward an outer peripheral side. Each of the second portions 108b of the second axis side gimbal frame extended part is provided with a second axis side concave curved face 105 which is recessed to an inner peripheral side on the second axis "R2".

(First Connection Mechanism)

As shown in FIG. 5, a pair of the plate holder extended parts 71 is located between a pair of the first axis side gimbal frame extended parts 107 and the movable body 20. Further, the second portion 107b of the first axis side gimbal frame extended part which holds the first axis side shaft 103 and the second plate holder extended portion 78 provided with the first axis side concave curved face 80 face each other on the first axis "R1".

The first connection mechanism 101 is structured so that the tip end of the first axis side shaft 103 protruded to an inner peripheral side from the first axis side gimbal frame extended part 107 contacts with the first axis side concave curved face 80. In this embodiment, the first axis side shaft 103 and the first axis side concave curved face 80 are point-contacted with each other. As a result, the turning support mechanism 21 is supported by the gimbal frame 100 in a turnable state around the first axis "R1" through the first connection mechanism 101. Therefore, the movable body 20 supported by the turning support mechanism 21 is turnably supported around the first axis "R1" by the gimbal mechanism 22.

In this embodiment, the gimbal frame 100 is structured of a plate spring and thus, when the tip end of the first axis side shaft 103 is contacted with the first axis side concave curved face 80, the second portion 107b of the first axis side gimbal frame extended part is resiliently bent to an outer peripheral side. As a result, the first axis side shafts 103 are pressed against the first axis side concave curved faces 80 by elastic restoration forces of a pair of the first axis side gimbal frame extended parts 107 toward an inner peripheral side.

(Fixed Body)

Figure 12:
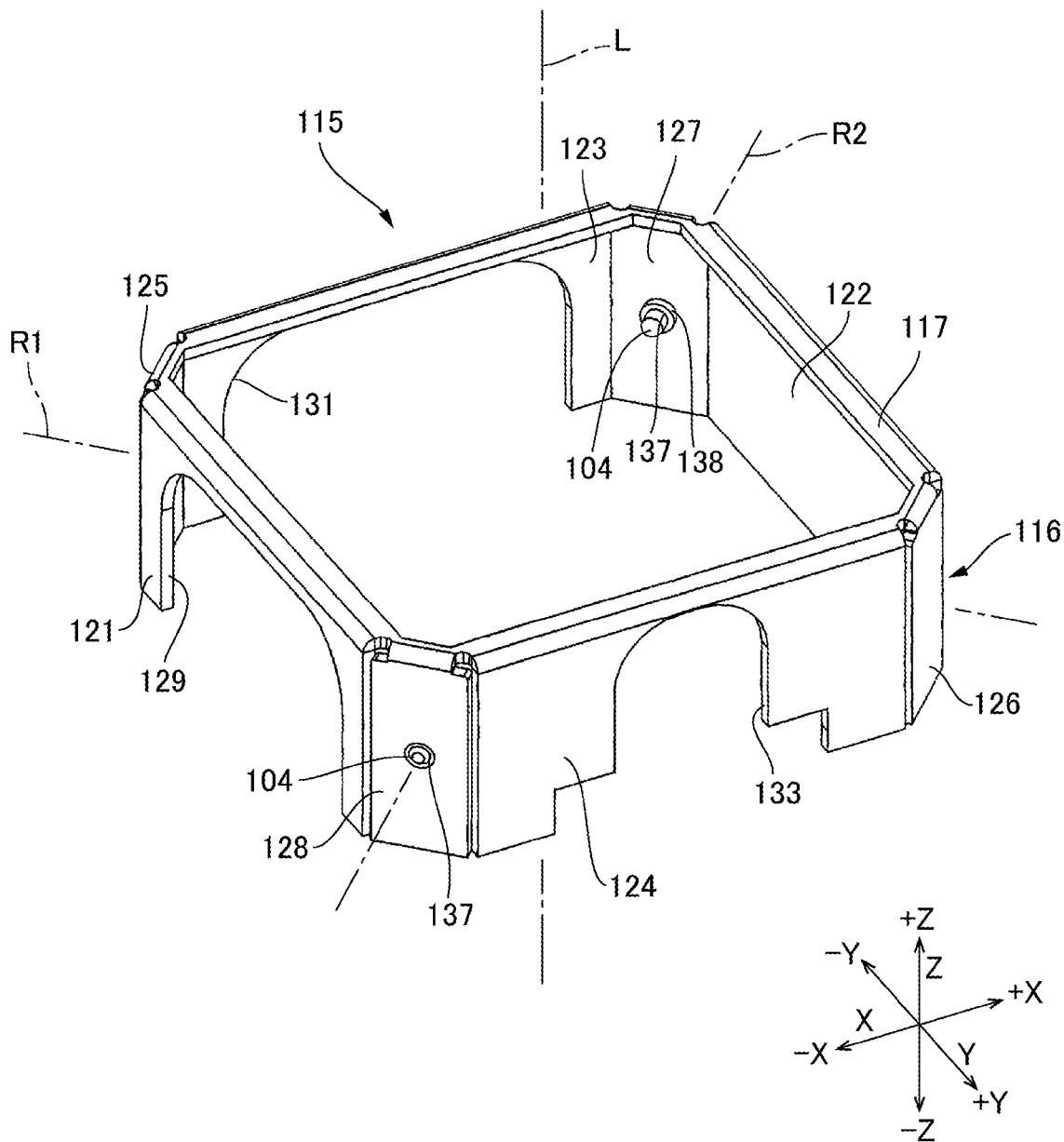
FIG. 12 is a perspective view showing a case and a second axis side shaft.

FIG. 12 is a perspective view showing a case and a second axis side shaft 104. As shown in FIG. 7, the fixed body 23 includes a frame-shaped case 115 which surrounds the movable body 20 and the turning support mechanism 21 from an outer peripheral side. The case 115 is made of metal and structured of nonmagnetic material. A shape of the case 115 when viewed in the "Z"-axis direction is octagonal. As shown in FIG. 12, the case 115 is provided with a frame part 116 located on an outer side in the radial direction with respect to the holder 29, and a frame plate part 117 which is protruded to an inner peripheral side from an end edge on the "+Z" direction side of the frame part 116.

The frame part 116 is provided with a first side plate 121 and a second side plate 122 which are extended in parallel to the "Y" direction, and a third side plate 123 and a fourth side plate 124 which are extended in parallel to the "X" direction. The first side plate 121 is located on the "−X" direction side with respect to the second side plate 122. The third side plate 123 is located on the "−Y" direction side with respect to the fourth side plate 124. Further, the frame part 116 is provided at diagonal positions in the first axis "R1" direction with a fifth side plate 125 which connects the first side plate 121 with the third side plate 123, and a sixth side plate 126 which connects the second side plate 122 with the fourth side plate 124. The fifth side plate 125 and the sixth side plate 126 are extended in parallel with each other. The fifth side plate 125 is located on the "−X" direction side with respect to the sixth side plate 126. In addition, the frame part 116 is provided at diagonal positions in the second axis "R2" direction with a seventh side plate 127 which connects the second side plate 122 with the third side plate 123, and an eighth side plate 128 which connects, the first side plate 121 with the fourth side plate 124. The seventh side plate 127 and the eighth side plate 128 are extended in parallel to each other. The seventh side plate 127 is located on the "−Y" direction side with respect to the eighth side plate 128.

As shown in FIGS. 7 and 12, the frame part 116 is provided with an first coil holding opening part 129 in the first side plate 121. The first coil holding opening part 129 is a cut-out part which is formed by cutting out the first side plate 121 from the "−Z" direction side. A first coil 130 (shake correction coil) is inserted into the first coil holding opening part 129. The first coil 130 is formed in an elliptical shape which is long in the circumferential direction and its center hole is directed toward the radial direction. Further, the frame part 116 is provided with a second coil holding opening part 131 in the third side plate 123. The second coil holding opening part 131 is a cut-out part which is formed by cutting out the third side plate 123 from the "−Z" direction side. A second coil 132 (shake correction coil) is inserted into the second coil holding opening part 131. The second coil 132 is formed in an elliptical shape which is long in the circumferential direction and its center hole is directed toward the radial direction. In addition, the frame part 116 is provided with a third coil holding opening part 133 in the fourth side plate 124. The third coil holding opening part 133 is a cut-out part which is formed by cutting out the fourth side plate 124 from the "−Z" direction side. A third coil 134 (rolling correction coil) is inserted into the third coil holding opening part 133. The third coil 134 is formed in an elliptical shape which is long in the "Z"-axis direction and its center hole is directed toward the radial direction. In this embodiment, as shown in FIG. 2, a flexible printed circuit board 6 is extended along outer peripheral faces of the fourth side plate 124, the first side plate 121 and the third side plate 123. The first coil 130, the second coil 132 and the third coil 134 are electrically connected with the flexible printed circuit board 6.

As shown in FIG. 12, the seventh side plate 127 and the eighth side plate 128 of the case 115 are respectively provided with a through hole 137 which penetrates in the second axis "R2" direction. Further, each of the seventh side plate 127 and the eighth side plate 128 is provided with a tube part 138 which is protruded in the second axis "R2" direction at an opening edge of the through hole 137 on an inner side face (face on a side where the second axis side gimbal frame extended part 108 is located). The second axis side shaft 104 penetrates through each of the through holes 137 of the seventh side plate 127 and the eighth side plate 128. The second axis side shaft 104 is formed in a columnar shape and is inserted into the through hole 137 and supported by the tube part 138. The second axis side shaft 104 is made of metal and is fixed to each of the seventh side plate 127 and the eighth side plate 128 by welding. The second axis side shaft 104 which is fixed to each of the seventh side plate 127 and the eighth side plate 128 is extended on the second axis "R2" in the second axis "R2" direction. An end part on an inner peripheral side of the second axis side shaft 104 is protruded to the inner peripheral side from the frame part 116. The end part on the inner peripheral side of the second axis side shaft 104 is provided with a hemispherical face.

(Second Connection Mechanism)

As shown in FIG. 6, the second connection mechanism 102 is structured so that the movable body 20, the turning support mechanism 21 and the gimbal frame 100 are disposed on an inner side with respect to the case 115, and that the tip end portions of the second axis side shafts 104 are inserted and contacted with the second axis side concave curved faces 105 of the second portions 108b of the second axis side gimbal frame extended parts. The fixed body 23 and the gimbal frame 100 are connected with each other by the second connection mechanism 102 and thus, the gimbal frame 100, the turning support mechanism 21 and the movable body 20 are supported by the fixed body 23 in a turnable state around the second axis "R2".

In this embodiment, the gimbal frame 100 is structured of a plate spring and thus, the second axis side gimbal frame extended part 108 is elastically deformable in the second axis "R2" direction. Therefore, when the second axis side shaft 104 is contacted with the second axis side concave curved face 105 of the second axis side gimbal frame extended part 108, the second axis side gimbal frame extended part 108 is set in a resiliently bent state to an inner peripheral side. As a result, the second axis side gimbal frame extended part 108 is elastically contacted with the second axis side shaft 104 from the inner peripheral side by an elastic restoration force directing toward an outer peripheral side. Therefore, connection of the second axis side gimbal frame extended part 108 with the frame part 116 is prevented or suppressed from being released.

(Shake Correction Magnetic Drive Mechanism and Rolling Correction Magnetic Drive Mechanism)

When the movable body 20 supported by the gimbal mechanism 22 is disposed on an inner peripheral side of the case 115, the first side wall 35 of the holder 29 and the first side plate 121 of the frame part 116 face each other through a gap space in the "X"-axis direction. The second side wall 36 of the holder 29 and the second side plate 122 face each other through a gap space in the "X"-axis direction. The third side wall 37 of the holder 29 and the third side plate 123 face each other through a gap space in the "Y"-axis direction. The fourth side wall 38 of the holder 29 and the fourth side plate 124 face each other through a gap space in the "Y"-axis direction. The fifth side wall 39 of the holder 29 and the fifth side plate 125 face each other through a gap space in the first axis "R1" direction. The sixth side wall 40 of the holder 29 and the sixth side plate 126 face each other through a gap space in the first axis "R1" direction. The seventh side wall 41 of the holder 29 and the seventh side plate 127 face each other through a gap space in the second axis "R2" direction. The eighth side wall 42 of the holder 29 and the eighth side plate 128 face each other through a gap space in the second axis "R2" direction.

As a result, as shown in FIG. 4, the first magnet 45 fixed to the first side wall 35 of the movable body 20 and the first coil 130 held by the case 115 face each other through a gap space in the "X" direction. The first magnet 45 and the first coil 130 structure the second shake correction magnetic drive mechanism 27. Therefore, the movable body 20 is turned around the "Y"-axis by feeding power to the first coil 130. Further, the second magnet 47 fixed to the third side wall 37 of the movable body 20 and the second coil 132 face each other through a gap space in the "Y" direction. The second magnet 47 and the second coil 132 structure the first shake correction magnetic drive mechanism 26. Therefore, the movable body 20 is turned around the "X"-axis by feeding power to the second coil 132. The shake correction magnetic drive mechanism 25 combines turning around the "X"-axis of the movable body 20 by the first shake correction magnetic drive mechanism 26 with turning around the "Y"-axis of the movable body 20 by the second shake correction magnetic drive mechanism 27 and thereby, the shake correction magnetic drive mechanism 25 turns the movable body 20 around the first axis "R1" and around the second axis "R2".

Further, in the state that the movable body 20 is disposed on an inner peripheral side of the case 115, the third magnet 49 fixed to the fourth side wall 38 of the movable body 20 and the third coil 134 face each other through a gap space in the "Y" direction. The third magnet 49 and the third coil 134 structure the rolling correction magnetic drive mechanism 28. Therefore, the movable body 20 is turned around the optical axis "L" by feeding power to the third coil 134.

In this embodiment, as shown in FIGS. 3 and 4, a first magnetic plate 141 is disposed on an opposite side to the movable body 20 with respect to the first coil 130 in the radial direction for the optical axis "L". The first magnetic plate 141 is formed in a rectangular shape which is long in the "Z"-axis direction and, when viewed in the radial direction, the first magnetic plate 141 is disposed at a position overlapping with the center in the "Z"-axis direction of the first coil 130. The first magnetic plate 141 faces the first magnet 45 of the movable body 20 through the first coil 130 and structures a magnetic spring for returning the movable body 20 to a reference angular position in a turning direction around the "Y"-axis. Further, the second magnetic plate 142 is disposed on an opposite side to the movable body 20 with respect to the second coil 132 in the radial direction for the optical axis "L". The second magnetic plate 142 is formed in a rectangular shape which is long in the "Z"-axis direction and, when viewed in the radial direction, the second magnetic plate 142 is disposed at a position overlapping with the center in the "Z"-axis direction of the second coil 132. The second magnetic plate 142 faces the second magnet 47 of the movable body 20 through the second coil 132 and structures a magnetic spring for returning the movable body 20 to a reference angular position in a turning direction around the "X"-axis.

(Operations and Effects)

According to this embodiment, the turning support mechanism 21 which turnably supports the movable body 20 around the optical axis "L" is turnably supported by the gimbal mechanism 22 around the first axis "R1" and around the second axis "R2" intersecting the optical axis "L". Therefore, the turning support mechanism 21 is turned around the first axis "R1" and around the second axis "R2" together with the movable body 20. Accordingly, even in a case that the movable body 20 is turned around the first axis "R1" or around the second axis "R2", the turning axis of the movable body 20 by the turning support mechanism 21 and the optical axis "L" of the movable body 20 are coincided with each other. As a result, in a case that the movable body 20 is being turned around the first axis "R1" or around the second axis "R2", when the rolling correction magnetic drive mechanism 28 is driven to turn the movable body 20, the movable body 20 is turned around the optical axis "L".

In this embodiment, the turning support mechanism 21 includes a plurality of spherical bodies 82 structured to roll between the plate roll 51 fixed to the movable body 20 and the plate holder 52 supported by the gimbal mechanism 22. Therefore, in the turning support mechanism 21, in order to maintain a state that the spherical bodies 82 surely slidably contact with both of the plate roll 51 and the plate holder 52, pressurization is required to generate for causing the plate roll 51 and the plate holder 52 to come close to each other in the "Z"-axis direction. Accordingly, in this embodiment, the magnetic attraction mechanism 54 is provided which includes the attraction part 86 provided in the plate roll 51 and the attracted part 87 provided in the plate holder 52. As a result, pressurization is generated by an attraction force of the magnetic attraction mechanism 54. In the magnetic attraction mechanism 54, each of the attraction part 86 and the attracted part 87 is provided in a part in the circumferential direction around the optical axis "L". Therefore, when the attracted part 87 is attracted by the attraction part 86, an angular position of the plate roll 51 with respect to the plate holder 52 is restricted around the optical axis "L". In other words, a reference angular position of the plate roll 51 around the optical axis "L" can be determined by the magnetic attraction mechanism 54.

Further, in this embodiment, the plate roll 51 and the plate holder 52 are nonmagnetic members, and the attracted part 87 is provided with the magnetic member 90 fixed to the plate roll 51. When the plate roll 51 and the plate holder 52 are nonmagnetic, the movable body 20 is prevented or suppressed from being inclined due to that the plate roll 51 and the plate holder 52 are attracted by the first magnet 45, the second magnet 47 and the third magnet 49.

In addition, in this embodiment, a length dimension in the circumferential direction of the attraction part 86 and a length dimension in the circumferential direction of the attracted part 87 are the same as each other. Therefore, when the attracted part 87 is attracted by the attraction part 86, the reference angular position of the plate roll 51 is easily determined.

Further, the magnet 89 is polarized and magnetized in the circumferential direction. Therefore, the reference angular position of the plate roll 51 can be determined with the position of the magnetized polarizing line of the magnet 89 as a reference.

In addition, in this embodiment, the attraction part 86 and the attracted part 87 are respectively provided on both sides with the optical axis "L" interposed therebetween. Therefore, the attraction parts 86 attract the attracted parts 87 and thus, the plate roll 51 and the facing part 56 of the plate holder 52 are capable of approaching each other in a well-balanced manner around the optical axis "L". Further, in this embodiment, the attraction part 86 and the attracted part 87 are respectively provided at four positions in the circumferential direction at equal angular intervals. Therefore, the plate roll 51 and the facing part 56 can be easily coaxially located by the attraction parts 86 attracting the attracted parts 87.

Further, in this embodiment, the plate roll 51 is provided with the plate roll ring-shaped part 57 surrounding the optical axis "L" and a pair of the plate roll extended parts 58 which are protruded from the plate roll ring-shaped part 57 to both sides in the second axis "R2" direction and are extended in the "Z"-axis direction. Each of a pair of the plate roll extended parts 58 is provided with the first plate roll extended portion 65 extended from the plate roll ring-shaped part 57 in the second axis "R2" direction, the second plate roll extended portion 66 which is extended in the "Z"-axis direction on an outer peripheral side with respect to the first plate roll extended portion 65 and is fixed to the movable body 20, and the third plate roll extended portion 67 which connects the first plate roll extended portion 65 with the second plate roll extended portion 66. The plate holder 52 is provided with the plate holder ring-shaped part 70 which is coaxial with the plate roll ring-shaped part 57 as the facing part 56, and a pair of the plate holder protruded parts 72 which are protruded to both sides in the second axis "R2" direction from the plate holder ring-shaped part 70. The spherical bodies 82 are located between the plate roll ring-shaped part 57 and the plate holder ring-shaped part 70. Each of a pair of the first plate roll extended portions 65 is provided with the attraction part 86, and each of a pair of the plate holder protruded parts 72 is provided with the attracted part 87. Therefore, the attraction parts 86 and the attracted parts 87 can be disposed on an outer peripheral side with respect to the plate roll ring-shaped part 57 and the plate holder ring-shaped part 70 between which the spherical bodies 82 are rolled. Accordingly, in comparison with a case that the attraction part 86 and the attracted part 87 are provided on an inner peripheral side with respect to the plate roll ring-shaped part 57 and the plate holder ring-shaped part 70, the reference angular position of the plate roll 51 is easily determined when the attracted part 87 is attracted by the attraction part 86.

In addition, in this embodiment, the plate roll 51 is provided with the plate roll ring-shaped part 57 surrounding the optical axis "L", and the plate roll protruded parts 59 which are protruded from the plate roll ring-shaped part 57 to both sides in the first axis "R1" direction. The plate holder 52 is provided with the plate holder ring-shaped part 70 coaxially disposed with the plate roll ring-shaped part 57 and a pair of the plate holder extended parts 71 which are protruded to both sides in the first axis "R1" direction from the plate holder ring-shaped part 70. Each of a pair of the plate holder extended parts 71 is provided with the first plate holder extended portion 77 extended from the plate holder ring-shaped part 70 in the first axis "R1" direction, the second plate holder extended portion 78 extended in the "Z"-axis direction on an outer peripheral side with respect to the first plate holder extended portion 77 and the movable body 20, and the third plate holder extended portion 79 which connects the first plate holder extended portion 77 with the second plate holder extended portion 78. The gimbal mechanism 22 supports each of a pair of the second plate holder extended portions 78. The spherical bodies 82 are located between the plate roll ring-shaped part 57 and the plate holder ring-shaped part 70. Each of a pair of the plate roll protruded parts 59 is provided with the attraction part 86 and each of a pair of the first plate holder extended portions 77 is provided with the attracted part 87. Therefore, the attraction part 86 and the attracted part 87 can be disposed on an outer peripheral side with respect to the plate roll ring-shaped part 57 and the plate holder ring-shaped part 70 where the spherical bodies 82 are rolled. Accordingly, in comparison with a case that the attraction part 86 and the attracted part 87 are provided on an inner peripheral side with respect to the plate roll ring-shaped part 57 and the plate holder ring-shaped part 70, the reference angular position of the plate roll 51 is easily determined when the attracted part 87 is attracted by the attraction part 86.

Further, in this embodiment, the stopper member 92 which is fixed to the plate roll 51 is provided. The stopper member 92 is provided with the ring-shaped plate part 93, which faces the facing part 56 through a gap space in the "Z"-axis direction on an opposite side to the plate roll 51 with respect to the facing part 56, one side circular arc wall 94 which faces the plate holder extended part 71 through a gap space from one side in the circumferential direction, and the other side circular arc wall 94 which faces the plate holder extended part 71 through a gap space from the other side in the circumferential direction. Therefore, in a case that an impact is applied from the outside or the like, the plate roll 51 can be prevented from turning beyond a predetermined angular range. In other words, when the plate roll 51 is going to turn beyond a predetermined angular range, the one side circular arc wall 94 or the other side circular arc wall 94 of the stopper member 92 fixed to the plate roll 51 is abutted with the plate holder extended part 71 to prevent further turning. Further, in a case that an impact is applied from the outside or the like, when the plate roll 51 and the plate holder 52 are going to separate from each other larger than a predetermined distance in the "Z"-axis direction, the facing part 56 of the plate holder 52 is abutted with the ring-shaped plate part 93 of the stopper member 92 fixed to the plate roll 51 and thus, the plate holder 52 is prevented from further moving. Therefore, the plate roll 51 and the plate holder 52 can be prevented from being excessively separated from each other in the "Z"-axis direction and the spherical bodies 82 can be prevented from disengaging from therebetween.

Further, in this embodiment, the gimbal mechanism 22 includes the gimbal frame 100, the first connection mechanism 101 which turnably connects the plate holder 52 with the gimbal frame 100 around the first axis "R1" on an outer peripheral side with respect to the movable body 20 in the first axis "R1" direction, and the second connection mechanism 102 which turnably connects the gimbal frame 100 with the fixed body 23 around the second axis "R2" on an outer peripheral side with respect to the movable body 20 in the second axis "R2" direction. Therefore, the turning support mechanism 21 can be turnably supported by the gimbal mechanism 22 around the first axis "R1" and around the second axis "R2".

In addition, this embodiment includes the shake correction magnetic drive mechanism 25 structured to turn the movable body 20 around the first axis "R1" and around the second axis "R2", and the rolling correction magnetic drive mechanism 28 structured to turn the movable body 20 around the optical axis "L". The shake correction magnetic drive mechanism 25 and the rolling correction magnetic drive mechanism 28 are arranged in the circumferential direction around the optical axis "L". The magnet 89 of the magnetic attraction mechanism 54 is disposed at an angular position around the optical axis "L" which is different from those of the first magnet 45 and the second magnet 47, i.e., the shake correction magnets and the third magnet 49, i.e., the rolling correction magnet. Therefore, the magnetic attraction mechanism 54, the shake correction magnetic drive mechanism 25 and the rolling correction magnetic drive mechanism 28 can be restrained from mutually affecting each other.

Modified Embodiments

The attracted part 87 may be provided with a second magnet which is fixed to the plate holder 52 instead of the magnetic member 90.

Further, it may be structured that the plate holder 52 is formed of a magnetic portion made of magnetic material and a nonmagnetic portion made of nonmagnetic material, and that the magnetic portion is utilized as the attracted part 87.

In accordance with an embodiment of the present invention, the attraction part 86 of the magnetic attraction mechanism 54 may be provided in a part of the plate holder 52 in the circumferential direction around the optical axis "L". In this case, the attracted part 87 is provided in a part in the circumferential direction of the plate roll 51.

Further, in the embodiment described above, the attraction part 86 and the attracted part 87 are respectively provided at four positions around the optical axis "L". However, it is sufficient that they are respectively provided at two positions on both sides with the optical axis "L" interposed therebetween.

Further, the stopper member 92 may be structured of two members which are fixed to the plate roll 51. In this case, the stopper member 92 includes a first stopper member which determines an angular range of the plate roll 51 which is turnable with respect to the plate holder 52, and a second stopper member which prevents the plate roll 51 and the plate holder 52 from separating from each other larger than a predetermined distance in the "Z"-axis direction.

The first stopper member is provided with one side stopper part which faces the plate holder extended part 71 through a gap space from one side in the circumferential direction, and the other side stopper part which faces the plate holder extended part 71 through a gap space from the other side in the circumferential direction. Further, the second stopper member is provided with a stopper part which faces the facing part 56 through a gap space in the "Z"-axis direction on an opposite side to the plate roll 51 with respect to the facing part 56.

Further, the shake correction magnetic drive mechanism 25 may include the first magnet and the second magnet which are fixed to the fixed body 23, and the first coil 130 and the second coil 132 which are fixed to the movable body 20. Similarly, the rolling correction magnetic drive mechanism 28 may include the third magnet 49 fixed to the movable body 20 and the third coil 134 fixed to the fixed body.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function, comprising:
    a movable body comprising a camera module;
    a turning support mechanism which turnably supports the movable body around an optical axis of a lens of the camera module;
    a gimbal mechanism which turnably supports the turning support mechanism around a first axis intersecting the optical axis and turnably supports the turning support mechanism around a second axis intersecting the optical axis and the first axis; and
    a fixed body which supports the movable body through the gimbal mechanism and the turning support mechanism;
    wherein the turning support mechanism comprises:
        a plate roll which is fixed to the movable body;
        a plate holder which comprises a facing part which faces the plate roll in a direction of the optical axis, and the plate holder being supported by the gimbal mechanism in a turnable state around the first axis;
        a plurality of spherical bodies which are capable of rolling between the plate roll and the facing part; and a magnetic attraction mechanism structured to generate an attraction force so that the plate roll and the facing part come close to each other in the direction of the optical axis;

wherein the magnetic attraction mechanism comprises:
an attraction part which is provided in a part in a circumferential direction around the optical axis in one of the plate roll and the plate holder; and
an attracted part which is provided in a part in the circumferential direction in an other of the plate roll and the plate holder and is attracted by the attraction part; and
wherein the attraction part comprises a magnet.

2. The optical unit with a shake correction function according to claim 1, wherein
the other of the plate roll and the plate holder is nonmagnetic, and
the attracted part comprises a magnetic member which is fixed to the other of the plate roll and the plate holder.

3. The optical unit with a shake correction function according to claim 1, wherein
the other of the plate roll and the plate holder is nonmagnetic, and
the attracted part comprises a second magnet which is fixed to the other of the plate roll and the plate holder.

4. The optical unit with a shake correction function according to claim 1, wherein the other of the plate roll and the plate holder comprises:
a magnetic portion made of magnetic material; and
a nonmagnetic portion made of nonmagnetic material,
wherein the attracted part is the magnetic portion.

5. The optical unit with a shake correction function according to claim 1, wherein
a length dimension in the circumferential direction of the attraction part and a length dimension in the circumferential direction of the attracted part are same as each other.

6. The optical unit with a shake correction function according to claim 1, wherein
the magnet is polarized and magnetized in the circumferential direction.

7. The optical unit with a shake correction function according to claim 1, wherein
the attraction part is provided on both sides with the optical axis interposed therebetween, and
the attracted part is provided at a position where the attracted part faces the attraction part on each of both sides with the optical axis interposed therebetween.

8. The optical unit with a shake correction function according to claim 7, wherein the plate roll comprises:
a plate roll ring-shaped part which surrounds the optical axis; and
a pair of plate roll extended parts which are protruded from the plate roll ring-shaped part to both sides in a direction of the second axis,
wherein each of the pair of the plate roll extended parts comprises:
a first plate roll extended portion which is extended from the plate roll ring-shaped part in the direction of the second axis;
a second plate roll extended portion which is extended in the direction of the optical axis on an outer peripheral side with respect to the first plate roll extended portion and is fixed to the movable body; and
a third plate roll extended portion which connects the first plate roll extended portion with the second plate roll extended portion,
wherein the plate holder comprises:
a plate holder ring-shaped part which is coaxial with the plate roll ring-shaped part; and
a pair of plate holder protruded parts which are protruded from the plate holder ring-shaped part to both sides in the direction of the second axis,
wherein the spherical bodies are located between the plate roll ring-shaped part and the plate holder ring-shaped part,
one of each of a pair of the first plate roll extended portions and each of a pair of the plate holder protruded parts is provided with the attraction part, and
an other of each of the pair of the first plate roll extended portions and each of the pair of the plate holder protruded parts is provided with the attracted part.

9. The optical unit with a shake correction function according to claim 8, further comprising:
a second stopper member which is fixed to the plate roll,
wherein the second stopper member comprises a stopper part which faces the facing part through a gap space on an opposite side to the plate roll with respect to the facing part in the direction of the optical axis.

10. The optical unit with a shake correction function according to claim 7, wherein the plate roll comprises:
a plate roll ring-shaped part which surrounds the optical axis; and
plate roll protruded parts which are protruded from the plate roll ring-shaped part to both sides in a direction of the first axis,
wherein the plate holder comprises:
a plate holder ring-shaped part which is coaxial with the plate roll ring-shaped part; and
a pair of plate holder extended parts which are protruded from the plate holder ring-shaped part to both sides in the direction of the first axis,
wherein each of the pair of the plate holder extended parts comprises:
a first plate holder extended portion which is extended from the plate holder ring-shaped part in the direction of the first axis;
a second plate holder extended portion which is extended in the direction of the optical axis on an outer peripheral side with respect to the first plate holder extended portion and the movable body; and
a third plate holder extended portion which connects the first plate holder extended portion with the second plate holder extended portion,
wherein the gimbal mechanism supports each of a pair of the second plate holder extended portions,
the spherical bodies are located between the plate roll ring-shaped part and the plate holder ring-shaped part,
one of each of a pair of the first plate holder extended portions and each of a pair of the plate roll protruded parts is provided with the attraction part, and
an other of each of the pair of the first plate holder extended portions and each of the pair of the plate roll protruded parts is provided with the attracted part.

11. The optical unit with a shake correction function according to claim 10, further comprising:
a first stopper member which is fixed to the plate roll,
wherein the first stopper member comprises:
one side stopper part which faces the plate holder extended part through a gap space from one side in the circumferential direction; and an other side stopper part which faces the plate holder extended part through a gap space from an other side in the circumferential direction.

12. The optical unit with a shake correction function according to claim 11, further comprising:
a second stopper member which is fixed to the plate roll,
wherein the second stopper member comprises a stopper part which faces the facing part through a gap space on an opposite side to the plate roll with respect to the facing part in the direction of the optical axis.

13. The optical unit with a shake correction function according to claim 10, further comprising:
a stopper member which is fixed to the plate roll,
wherein the stopper member comprises:
a stopper part which faces the facing part through a gap space on an opposite side to the plate roll with respect to the facing part in the direction of the optical axis;
one side stopper part which faces the plate holder extended part through a gap space from one side in the circumferential direction; and
an other side stopper part which faces the plate holder extended part through a gap space from an other side in the circumferential direction.

14. The optical unit with a shake correction function according to claim 10, further comprising:
a second stopper member which is fixed to the plate roll,
wherein the second stopper member comprises a stopper part which faces the facing part through a gap space on an opposite side to the plate roll with respect to the facing part in the direction of the optical axis.

15. The optical unit with a shake correction function according to claim 1, wherein the gimbal mechanism comprises:

a gimbal frame;
a first connection mechanism which turnably connects the plate holder with the gimbal frame around the first axis on an outer peripheral side in a direction of the first axis with respect to the movable body; and
a second connection mechanism which turnably connects the gimbal frame with the fixed body around the second axis on an outer peripheral side in a direction of the second axis with respect to the movable body.

16. The optical unit with a shake correction function according to claim 1, further comprising:
a shake correction magnetic drive mechanism structured to turn the movable body around the first axis and around the second axis; and
a rolling correction magnetic drive mechanism structured to turn the movable body around the optical axis,
wherein the shake correction magnetic drive mechanism and the rolling correction magnetic drive mechanism are arranged in the circumferential direction around the optical axis,
wherein the shake correction magnetic drive mechanism comprises:
a shake correction magnet which is fixed to one of the movable body and the fixed body; and
a shake correction coil which is fixed to an other of the movable body and the fixed body,
wherein the rolling correction magnetic drive mechanism comprises:
a rolling correction magnet which is fixed to one of the movable body and the fixed body; and
a rolling correction coil which is fixed to an other of the movable body and the fixed body;
wherein the magnet is disposed at an angular position different from positions of the shake correction magnet and the rolling correction magnet around the optical axis.

* * * * *